US009767432B1

(12) United States Patent
Brazeau et al.

(10) Patent No.: US 9,767,432 B1

(45) Date of Patent: Sep. 19, 2017

(54) INVENTORY EVENT DETECTION USING RESIDUAL HEAT INFORMATION

(71) Applicant: Amazon Technologies, Inc., Seattle, WA (US)

(72) Inventors: Jeremiah David Brazeau, Hudson, NH (US); Sergio Mendola, Georgetown, MA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/187,535

(22) Filed: Jun. 20, 2016

(51) Int. Cl.

| | |
|---|---|
| ***G06F 19/00*** | (2011.01) |
| ***G06Q 10/08*** | (2012.01) |
| ***G06K 7/10*** | (2006.01) |
| ***G06K 19/06*** | (2006.01) |

(52) U.S. Cl.
CPC ....... *G06Q 10/087* (2013.01); *G06K 7/10861* (2013.01); *G06K 7/10891* (2013.01); *G06K 19/06028* (2013.01)

(58) Field of Classification Search
USPC .............................. 235/385; 705/28; 62/129
See application file for complete search history.

(56) References Cited

U.S. PATENT DOCUMENTS

| | | | | |
|---|---|---|---|---|
| 8,280,547 B2 | 10/2012 | D'Andrea et al. | | |
| 9,087,314 B2 | 7/2015 | Hoffman et al. | | |
| 2013/0245810 A1* | 9/2013 | Sullivan | G06Q 10/08 | 700/214 |
| 2013/0325673 A1* | 12/2013 | Abdic | G06Q 10/087 | 705/28 |
| 2014/0165614 A1* | 6/2014 | Manning | F25D 29/00 | 62/62 |

OTHER PUBLICATIONS

U.S. Appl. No. 15/187,600, filed Jun. 20, 2016, Titled: Inventory Event Detection Using Residual Light Information.

* cited by examiner

*Primary Examiner* — Ahshik Kim

(74) *Attorney, Agent, or Firm* — Kilpatrick Townsend & Stockton LLP

(57) ABSTRACT

An inventory management system is described. The inventory management system may be configured to use thermal image data to determine that an item was successfully placed in a storage structure. As part of this process, thermal images may be processed to identify instances of temperature differences that correspond to the item. These temperature differences may be evidence of a recent touch by an operator or may be generated by temperature changing devices during item placement.

20 Claims, 17 Drawing Sheets

INVENTORY EVENT DETECTION USING RESIDUAL HEAT INFORMATION

CROSS-REFERENCE TO RELATED APPLICATION

This application is related to application Ser. No. 15/187,600, filed on Jun. 20, 2016, entitled "Inventory Event Detection Using Residual Light Information," the entire contents of which is hereby incorporated by reference as if fully set forth herein.

BACKGROUND

Modern computer systems are able to track and manage certain physical tasks. To do so, such computer systems may rely on manual entry of information about completion and/or status of the physical tasks. For example, in a task tracking system, a user who completes a physical task of a project may indicate completion by performing some manual action (e.g., pushing a button, scanning a barcode, hitting a key on a keyboard, clicking a mouse, etc.). Information about the manual action may be shared with a computer (or received by the computer) of the task tracking system. The computer can interpret the information about the manual action to determine that the task has been completed. The computer can also store information about the completed action and/or update a record associated with the project.

BRIEF DESCRIPTION OF THE DRAWINGS

Various embodiments in accordance with the present disclosure will be described with reference to the drawings, in which.

DETAILED DESCRIPTION

Figure 1:
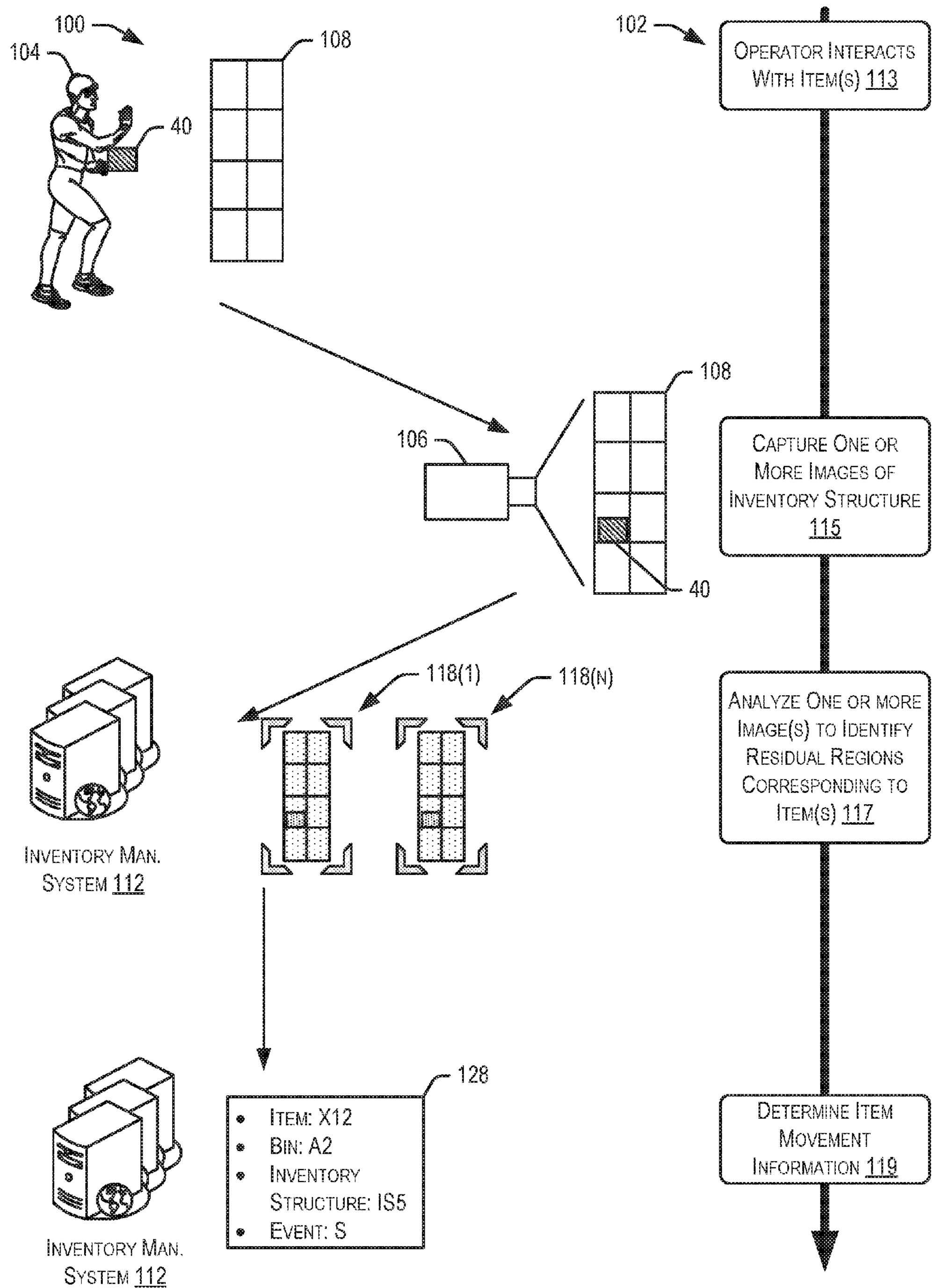
FIG. 1 illustrates an example block diagram depicting an example flow for implementing techniques relating to determining inventory events using residual information as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the embodiment being described.

Examples described herein are directed to determining inventory events using residual information. In particular, the techniques are directed to identifying aspects of how an operator has interacted with an inventory item and/or a storage structure. Doing so may minimize the number of physical tracking actions (e.g., scanning objects with a handheld scanner, pushing buttons, etc.) typically taken by the operator and used to track the inventory. These physical tracking actions can be time consuming and can also introduce opportunities for human error (e.g., scanning a wrong storage bin location for an inventory item), both of which can increase operation costs and reduce achievable throughput. In some examples, the techniques described herein may eliminate the need for one or more physical tracking actions. This may be achieved by utilizing certain types of residual information to detect inventory events (e.g., an inventory placement event or an inventory removal event).

In at least one example, this information is determined from instances of differences in temperature between an inventory item and its surroundings after an operator has touched the inventory item, as shown in one or more thermal images. The inventory item may be heated at a first location (e.g., an inventory storage bin) and placed by the operator at a second cooler location (e.g., a storage structure) to increase the temperature differences. The thermal images can be captured by a thermal camera before, during, and/or after the operator has touched the inventory item. Using the thermal images, it can be determined that the operator placed the inventory item (e.g., left it behind) in the storage structure (e.g., an inventory placement event). This may be achievable at least in part because a residual heat trace corresponding to the inventory item may be present in the one or more thermal images. The inventory placement event may be determined without the operator performing a physical tracking action such as pushing a button indicating that the item has been placed. Information about the inventory item being placed in the storage structure can be saved by an inventory management system. In some examples, information about the residual heat trace is combined with other information (e.g., position information) to determine a position with respect to the storage structure (e.g., a compartment) where the inventory placement event occurred.

In at least one example, the techniques described herein may derive information from instances of a certain type of light emissions, as shown in one or more images. For example, the inventory item and/or compartments of the storage structure can include a phosphorescent material, and the operator can wear a set of gloves or a wristband that includes a lighting element that excites the phosphorescent material. The images can be captured by an image capture device before, during, and/or after the operator has touched the inventory item. The images can be processed to detect instances of the phosphorescent material in an excited state (e.g., glowing). Using these instances of excited phosphorescent material in the images, it can be determined that the operator placed the inventory item in the storage structure (e.g., an inventory placement event). It can also be determined that the operator removed the inventory item from the storage structure (e.g., an inventory removal event). This may be achievable at least in part because a residual light trace (e.g., a "glowing" shape) corresponding to the inventory item or the compartment may be present in the one or more images. The inventory placement event may be determined without the operator performing a physical tracking action such as pushing a button indicating that the item has been placed. Information about the inventory item being placed in the storage structure can be saved by an inventory management system. In some examples, information about the residual light trace is combined with other information (e.g., position information) to determine a position with respect to the storage structure (e.g., a compartment) where the inventory placement event took place.

FIG. 1 illustrates a simplified block diagram 100 depicting an example process 102 for implementing techniques relating to determining inventory events using residual information, according to at least one example. The diagram 100 can include an operator 104 that interacts with an inventory item 40 and a storage structure 108. The diagram 100 also includes an image capture device 106 that is configured to capture one or more images and an inventory management system 112 that is configured to process the images and identify inventory events.

The process 102 may begin at 113 by the operator 104 interacting with the inventory item 40. For example, the operator 104 can physically move the inventory item 40 from a first location and place the inventory item 40 in one or more compartments of the storage structure 108. In some examples, the operator 104 can physically move the inventory item 40 from one of the compartments of the storage structure 108 and place the inventory item 40 at a second location. As described herein, the storage structure 108 can be moveable (e.g., an inventory holder coupled to a mobile drive unit) or fixed (e.g., an inventory exchange wall).

At 115, the image capture device 106 may capture one or more images 118(1)-**118(*n*) of the storage structure 108 including the inventory item 40. In some examples, the one or more images 118 are captured before, during, and/or after the time when the operator 104 interacts with the inventory item 40 and/or the storage structure 108. The one or more images 118 may be thermal images that depict residual temperature differences (e.g., using different colors, gradients, and the like) or other images that depict residual light differences along the electromagnetic spectrum, which may be within a range of visible light or outside this range. The residual temperature differences may be present in the images 118 based at least in part on heat transfer that occurred when the operator 104 interacted with the inventory item 40 and/or the storage structure 108. The residual light differences may be present in the images 118 based at least in part on certain light-activated material being activated when the operator 104 interacted with the inventory item 40 and/or the storage structure 108**.

The images 118 can be provided to the inventory management system 112. The inventory management system 112 can be configured to manage inventory items stored in a warehouse, processed at a processing facility, and the like. In some examples, the inventory management system 112 can be configured to manage the operation of the image capture device 106 and any other device related to implementing the techniques described herein. For example, the inventory management system 112 can instruct the image capture device 106 to capture the images 118.

At 117, the inventory management system 112 can analyze the one or more images 118 to identify residual regions corresponding to the inventory item 40. The residual regions may be regions of the images 118 that are present as a result of the residual temperature differences and/or the residual light differences. The inventory management system 112 can identify these regions and associate them with the inventory item 40.

At 119, the inventory management system 112 can determine item movement information 128. The item movement information 128 may be determined based at least in part on the residual regions in the images 118 and any other suitable information received from other systems (e.g., position information detected by a light sensor, scan information from a handheld scanner, and the like). The item movement information 128 can identify the inventory item 40 (e.g., "X12"), the storage structure 108 (e.g., "IS5"), a specific position with respect to the storage structure 108 (e.g., "Bin: A2"), an event type (e.g., "S" meaning the inventory item 40 was placed), and any other suitable information related to removal from or stowing of the inventory item 40 in the storage structure 108. In some examples, the item movement information 128 on its own represents an inventory event. In some examples, the item movement information 128 is processed to determine the inventory event.

Figure 2:
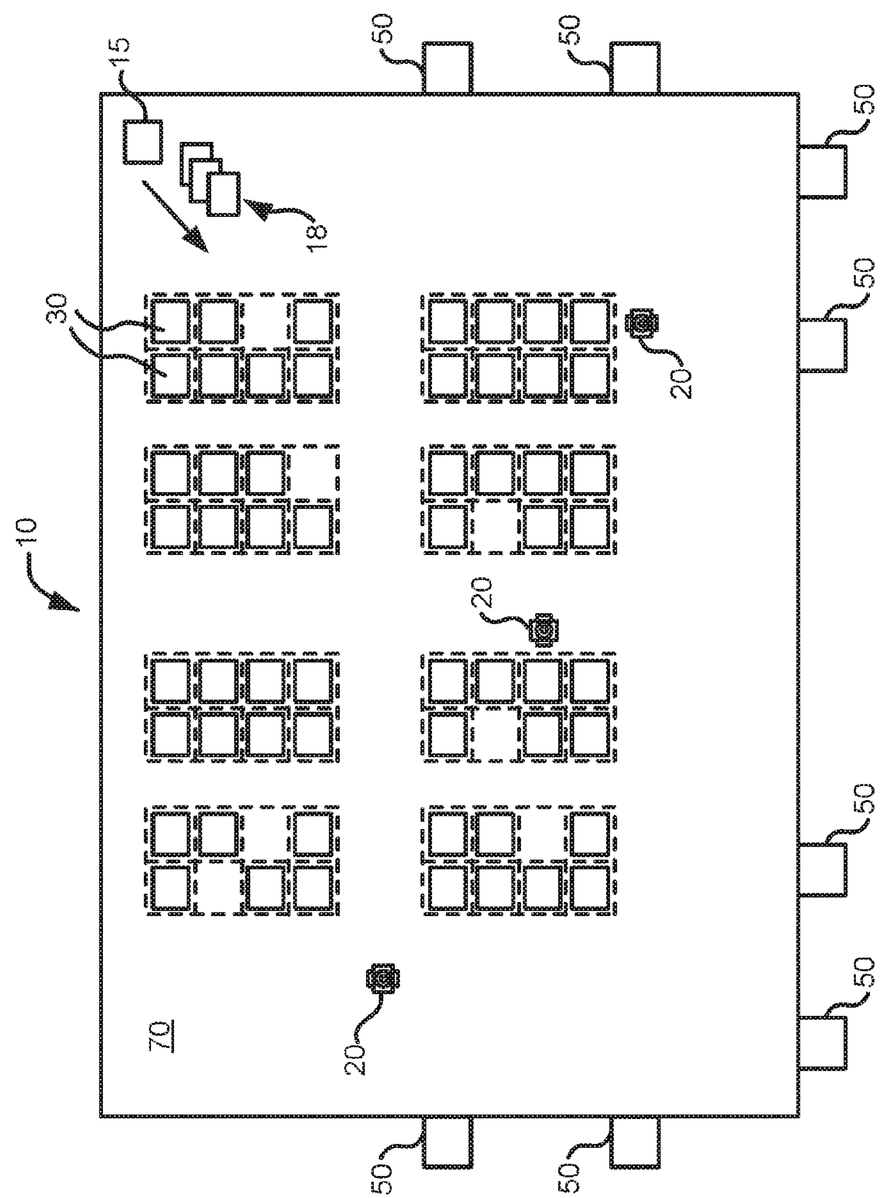
FIG. 2 illustrates components of an inventory system according to at least one example.

FIG. 2 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10. In some examples, such human or automated operators may be considered item manipulators.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
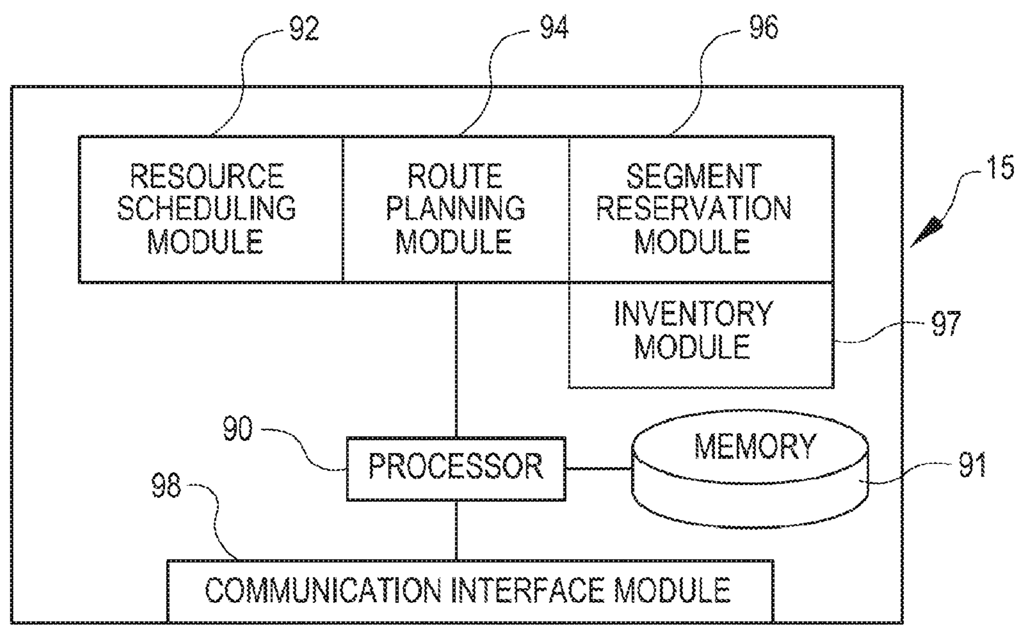
FIG. 3 illustrates in greater detail the components of an example management module that may be utilized in particular examples of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
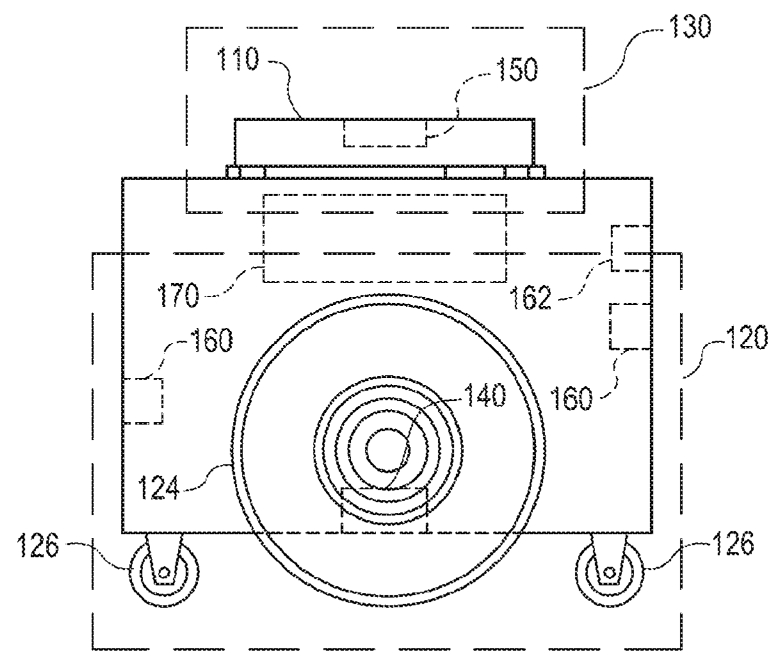
FIGS. 4 and 5 illustrate in greater detail an example mobile drive unit that may be utilized in particular examples of the inventory system shown in FIG. 2.
Figure 5:
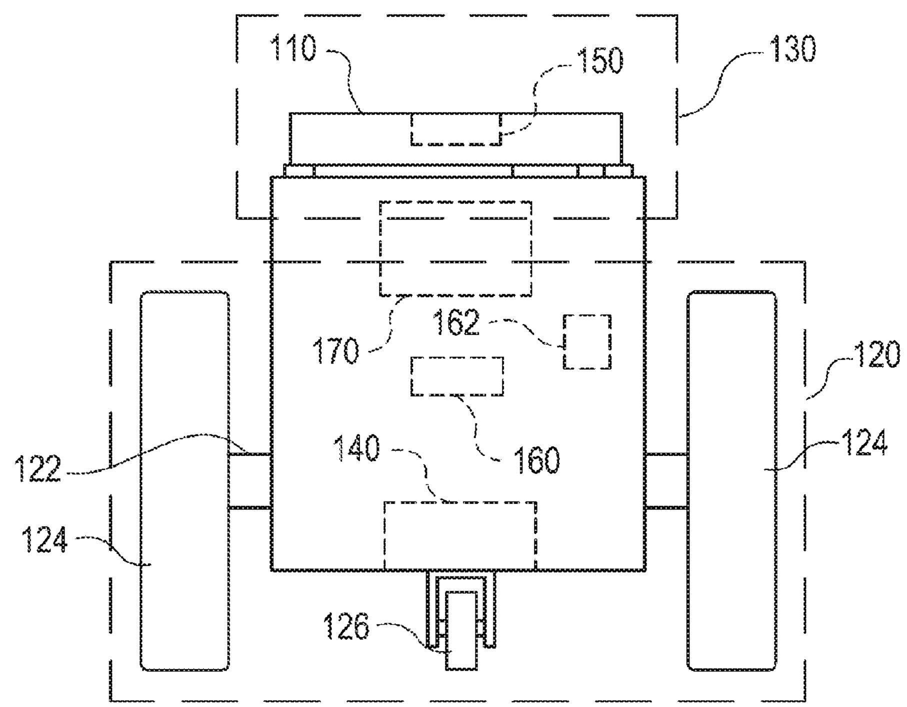

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a “drive agent”) operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term “mobile drive unit” includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
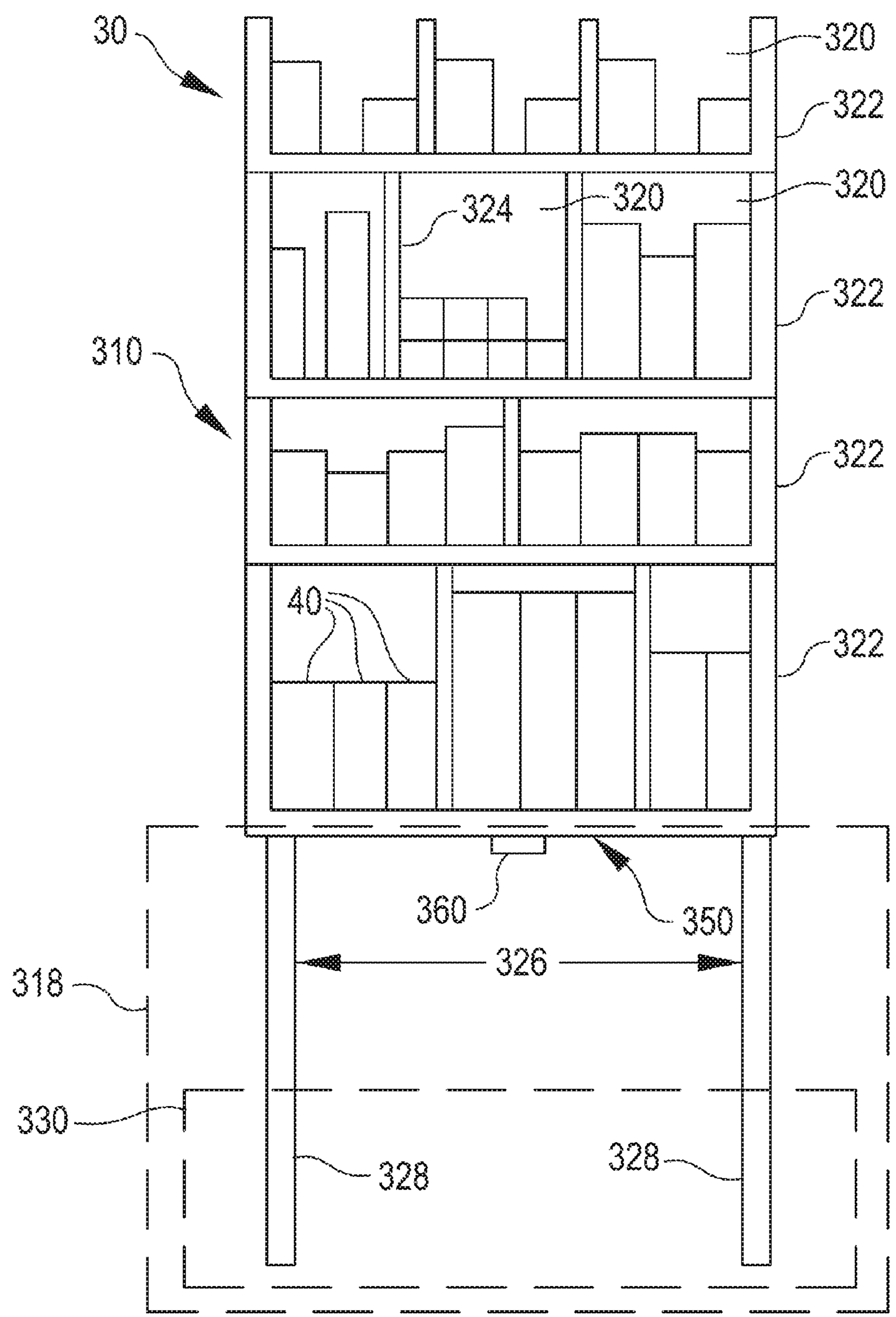
FIG. 6 illustrates in greater detail an example inventory holder that may be utilized in particular examples of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory compartments 320, each capable of holding inventory items 40. Inventory compartments 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory compartments 320 may be formed by a plurality of adjustable dividers 324 that may be moved to resize one or more inventory compartments 320. In alternative embodiments, frame 310 may represent a single inventory compartment 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory compartments 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks 450. Mobile drive unit 20 may be configured to detect fiducial marks 450 and to determine the location of mobile drive unit 20 and/or measure its movement based on the detection of fiducial marks 450.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

Figure 7:
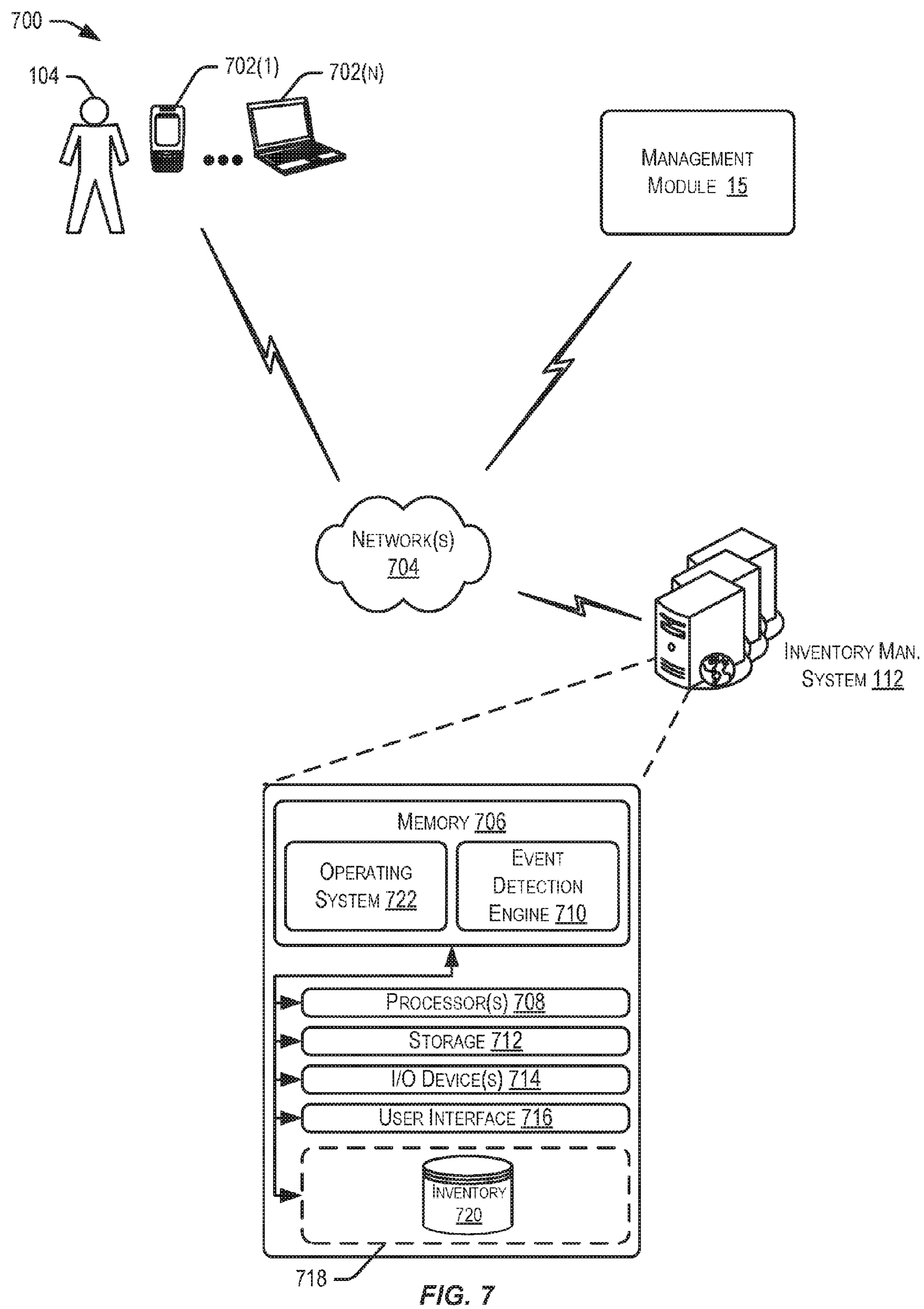
FIG. 7 illustrates an example architecture or system for implementing techniques relating to determining inventory events using residual information as described herein, according to at least one example.

FIG. 7 illustrates an example schematic architecture 700 for implementing techniques relating to determining inventory events using residual information, in accordance with at least one example. The architecture 700 may include the management module 15, the inventory management system 112, and one or more user devices 702(1)-**702(*n*) (the "user devices 702") in communication with each other via one or more network(s) 704. The network 704 can include any appropriate network, including an intranet, the Internet, a cellular network, a local area network or any other such network or combination thereof. Components used for the architecture 700 may depend at least in part upon the type of network and/or environment selected. The network 704 may be proprietary or non-proprietary. The architecture 700 may be implemented as part of implementing the inventory system 10**.

As discussed above, the management module 15 may be configured to manage the movement and operation of the mobile drive units 20. The inventory management system 112 may be configured to manage the determination of inventory events, along with management of inventory generally. In some examples, the inventory management system 112 and the management module 15 work in concert to manage inventory.

The user device 702 can include any suitable user device configured to provide and/or receive data from the management module 15 and/or the inventory management system 112. Examples of such devices include personal computers, handheld scanning devices, cell phones, handheld messaging devices, laptop computers, set-top boxes, personal data assistants, electronic book readers, and the like. Accordingly, the user device 702 may include memory for storing an operating system and/or modules, processors capable of accessing the memory for executing instructions, and an interface for communicating with the operator 104 and/or other devices. The processors may include one or more general purpose computers, dedicated microprocessors, or other processing devices capable of communicating electronic information. Examples of the processor include one or more application-specific integrated circuits (ASICs), field programmable gate arrays (FPGAs), digital signal processors (DSPs) and any other suitable specific or general purpose processors. Computer-executable instruction, software or firmware implementations of the processor may include computer-executable or machine-executable instructions written in any suitable programming language to perform the various functions described.

The memory may include more than one memory and may be distributed. The memory may store program instructions that are loadable and executable on the processor, as well as data generated during the execution of these programs. Depending on the configuration and type of memory including the user device 702, the memory may be volatile (such as random access memory (RAM)) and/or non-volatile (such as read-only memory (ROM), flash memory, or other memory).

The inventory management system 112 may include one or more computers, perhaps arranged in a cluster of servers or as a server farm. The memory and processors that make up these computers may be located within one computer or distributed throughout many computers as detailed herein. These servers may be configured to manage inventory of the inventory system 10 and other systems. For example, the inventory management system 112 may be configured to manage inventory offered in connection with an electronic marketplace. In this example, the inventory management system 112 may manage inventory while it is located at a variety of different locations (e.g., warehouses, shipping centers, and other locations). This may also involve end-to-end tracking of inventory. In some examples, the techniques described herein may enable the inventory management system 112 to manage the inventory of a particular warehouse or multiple warehouses in an efficient manner.

The inventory management system 112 may include at least one memory 706 and one or more processing units (or processor(s)) 708. The processor 708 may be implemented as appropriate in hardware, computer-executable instructions, software, firmware, or combinations thereof. Computer-executable instruction, software or firmware implementations of the processor 708 may include computer-executable or machine-executable instructions written in any suitable programming language to perform the various functions described. The memory 706 may include more than one memory and may be distributed throughout the inventory management system 112. The memory 706 may store program instructions (e.g., an event detection engine 710) that are loadable and executable on the processor(s) 708, as well as data generated during the execution of these programs. Depending on the configuration and type of memory included in the inventory management system 112, the memory 706 may be volatile (such as random access memory (RAM)) and/or non-volatile (such as read-only memory (ROM), flash memory, or other memory). The inventory management system 112 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some examples, the memory 706 may include multiple different types of memory, such as static random access memory (SRAM), dynamic random access memory (DRAM), or ROM. The memory 706 may also include an operating system 722 for interacting with the inventory management system 112.

In some examples, the inventory management system 112 may also include additional storage 712, which may include removable storage and/or non-removable storage. The additional storage 712 may include, but is not limited to, magnetic storage, optical disks, and/or tape storage. The disk drives and their associated computer-readable media may provide non-volatile storage of computer-readable instructions, data structures, program modules, and other data for the computing devices. The memory 706 and the additional storage 712, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture 700. The inventory management system 112 may also include input/output (I/O) device(s) and/or ports 714, such as for enabling connection with a keyboard, a mouse, a pen, a voice input device, a touch input device, a display, speakers, a printer, or other I/O device.

In some examples, the inventory management system 112 may also include a user interface 716. The user interface 716 may be utilized by an operator, or other authorized user to access portions of the inventory management system 112. In some examples, the user interface 716 may include a graphical user interface, web-based applications, programmatic interfaces such as application programming interfaces (APIs), or other user interface configurations. The inventory management system 112 may also include a data store 718. In some examples, the data store 718 may include one or more data stores, databases, data structures, or the like for storing and/or retaining information associated with the inventory management system 112. Thus, the data store 718 may include data structures, such as an inventory database 720.

The inventory database 720 may be used to retain information about manifests or lists of items within the inventory system 10. For example, this can include information about inventory items expected to be placed in the inventory holder 30. The information in the inventory database 720 can be generated by operators, whether human or automated, who place and retrieve inventory items. For example, the human operator 104 who stows items in the inventory holder 30 can use the user device 702(1) to scan barcodes on inventory items and other barcodes associated with compartments in the inventory holder 30 to indicate what inventory items are placed where in the inventory holder 30. In some examples, the techniques described herein can minimize the number of scans required to generate the information in the inventory database 720. In particular, at least a portion of the information can be generated automatically without the operator 104 scanning, pushing buttons, or performing any other physical actions. This information can also indicate inventory tracking events such as inventory placement events and inventory removal events.

The event detection engine 710 can include one or more modules, engines, components or the like configured to implement the techniques described herein. For example, the event detection engine 710 may include image processing functionality in order to detect residual heat traces and/or residual light traces. The event detection engine 710 may also include inventory management functionality to generate and store inventory events. In some examples, the event detection engine 710 may be included in the inventory management system 112 and/or one of the user devices 702.

Figure 8:
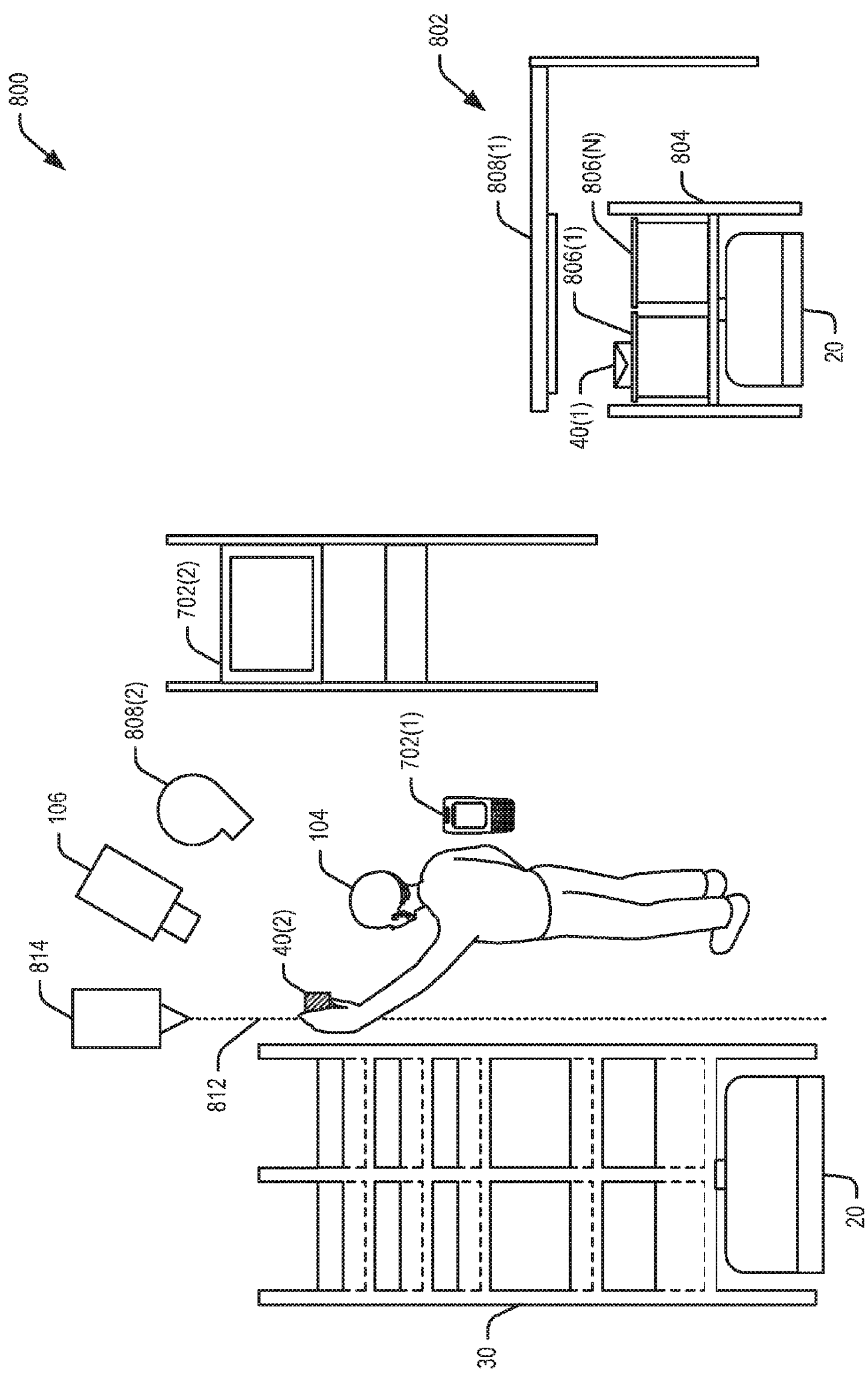
FIG. 8 illustrates an example inventory station at which techniques relating to determining inventory events using residual information as described herein can be implemented, in accordance with at least one example.

FIG. 8 illustrates an example inventory station 800 for implementing techniques relating to determining inventory events using residual information, in accordance with at least one example. The inventory station 800 can include the inventory holder 30 coupled to the mobile drive unit 20. The mobile drive unit 20 can be instructed to present any one of a plurality of sides of the inventory holder 30 to the operator 104. The inventory station 800 can also include a temporary storage location 802. The temporary storage location 802 can be used to store inventory (e.g., an inventory item 40(1)) for a short period of time. The temporary storage location 802 can include a storage frame 804 and a temperature changing device 808(1). The storage frame 804 can be configured to retain one or more inventory containers 806(1)-806(*n*). The storage frame 804 can also be configured to couple with the mobile drive unit 20.

The temperature changing device 808(1) can be any suitable device (or multiple devices) capable of heating and/or cooling the inventory items 40 held by the inventory containers 806 and/or otherwise located at the temporary storage location 802. The temperature changing device 808(1) can be configured to heat items using principles of conduction, convection, and/or radiation. For example, the temperature changing device 808(1) can include one or more heating lamps disposed above the inventory items 40 configured to radiate heat toward the inventory items 40. As an additional example, the temperature changing device 808(1) can include a heating fan configured to blow heated air over the inventory items 40. As an additional example, the temperature changing device 808(1) can include heating elements disposed throughout the inventory containers 806 and/or the storage frame 804 configured to warm the inventory items 40 via contact with the inventory items 40. In some examples, heating the inventory items 40 (e.g., the inventory item 40(2)) prior to being placed in the inventory holder 30 may provide for an increased thermal contrast between the inventory holder 30 and the inventory item 40(2) that is being placed in the inventory holder. This thermal contrast can be captured in one or more thermal images captured by the image capture device 106.

The temperature changing device 808(1) can be configured to cool items using any suitable technique. For example, the temperature changing device 808(1) can include one or more fans configured to blow air over one or more faces of the inventory holder 30. In some examples, the temperature changing device 808(1) may also include the functionality to pre-cool the air that is blown over the face of the inventory holder 30. This can include a refrigeration system such as is common in air conditioning systems. Cooling the inventory holder 30 may provide for increased thermal contrast between the inventory holder 30 and the inventory item 40(2) that is being placed in the inventory holder 30. This thermal contrast can be captured in one or more images captured by the image capture device 106.

In some examples, the temperature changing device 808 can be included in an automated operator (e.g., a robotic arm) or other device configured to place and/or remove the inventory items 40 (e.g., to/from the inventory holder 30 or other storage structure). In this manner, the automated operator may heat and/or cool the inventory item 40 prior to picking up the inventory item 40, during movement of the inventory item 40, and/or after placement of the inventory item 40.

The operator 104 can utilize the user devices 702(1), 702(2) to perform techniques relating to interacting with inventory (e.g., stowing and removing items) at the inventory station 800. For example, information can be presented on a display of the user device 702(2) that instructs the operator 104 to retrieve the inventory item 40(1) from the temporary storage location 802 and place the inventory item 40(1) in the inventory holder 30. The operator 104 may use the user device 702(1) to record her interactions with the inventory item 40(1). For example, interactions including scanning the inventory item 40(1) and scanning the particular compartment of the inventory holder 30 in which the inventory item 40(1) was placed.

The inventory station 800 can also include the image capture device 106, a position detection device 814, and a temperature changing device 808(2). As introduced herein, the image capture device 106 can be configured to capture one or more images of the inventory holder 30. In some examples, the image capture device 106 may include a thermal imaging device or other suitable device capable of capturing one or more thermal images using infrared radiation. Images captured using the thermal imaging device may have regions that represent a range of temperatures. In some examples, the images may be monochromatic and/or may be mapped to a range of colors. In some examples, the image capture device 106 may include an image capture device configured with the appropriate filters to detect light-activated material. For example, the light-activated material may emit electromagnetic radiation at any suitable frequency along the electromagnetic spectrum, and the image capture device 106 may be configured to detect the emission of the electromagnetic radiation. In some examples, the light-activated material may emit electromagnetic radiation at frequencies between near ultraviolent to far infrared, which can include frequencies that are visible to humans. Examples of the light-activated material may include, but are not limited to, zinc sulfide, strontium aluminate, calcium sulfide, alkaline earth metal silicate, radium, promethium, tritium, and other materials having phosphorescent and/or luminescent characteristics. As described herein, the light-activated materials may be included in a fluid that can be applied to objects, applied to a substrate that can be attached to objects, and/or associated with objects in any other suitable manner.

The position detection device 814 may be any suitable device configured to detect a position of objects with respect to itself. For example, the position detection device 814 may be configured to generate a light plane 812 that is about parallel to a face of the inventory holder 30 to detect positions where objects intersect (e.g., pass through) the light plane 812 (e.g., a hand of the operator 104 holding the inventory item 40(2)). In some examples, the position detection device 814 may also detect other information about the objects that intersect the light plane 812. Such other information may indicate dimensional characteristics of the objects. In some examples, the position detection device 814 may be a Light Detection and Ranging (LIDAR) device or other suitable laser scanner or 3-Dimensional scanner. The position detection device 814 can be mounted in any suitable manner. For example, the position detection device 814 can be mounted above the operator 104 and/or to the side of the operator 104 in a frame or other suitable structure. Information received from the position detection device 814 may indicate an intersection position on the light plane 812. This information can be used by the inventory management system 112 or other suitable device to correlate the intersection position with one or more compartments of the inventory holder 30. The temperature changing device 808 (2) can include functionality similar to the temperature changing device 808(1).

In some examples, the techniques described herein may be implemented at the inventory station 800 using variations of storage structures other than the inventory holder 30. For example, as part of an item removal process, the operator 104 may interact with a storage structure to remove one or more items from the storage structure and place each of the items in one of a plurality of inventory containers 806. In some examples, the image capture device 106 may be configured to capture one or more images, including thermal images, of the plurality of inventory containers 806 at different points in time while the operator 104 places the items in the inventory containers 806. In some examples, each inventory container 806 may be associated with a customer order or may otherwise function to hold a set of related items. Using the techniques described herein, it may be determined and/or confirmed that a particular item was placed in a particular inventory container 806. This determination may be based on residual heat information or residual light information present in the one or more images and associated with the particular item and/or the particular inventory container 806. This may function to confirm that a complete set of expected items is included in each of the inventory containers 806.

Figure 9:
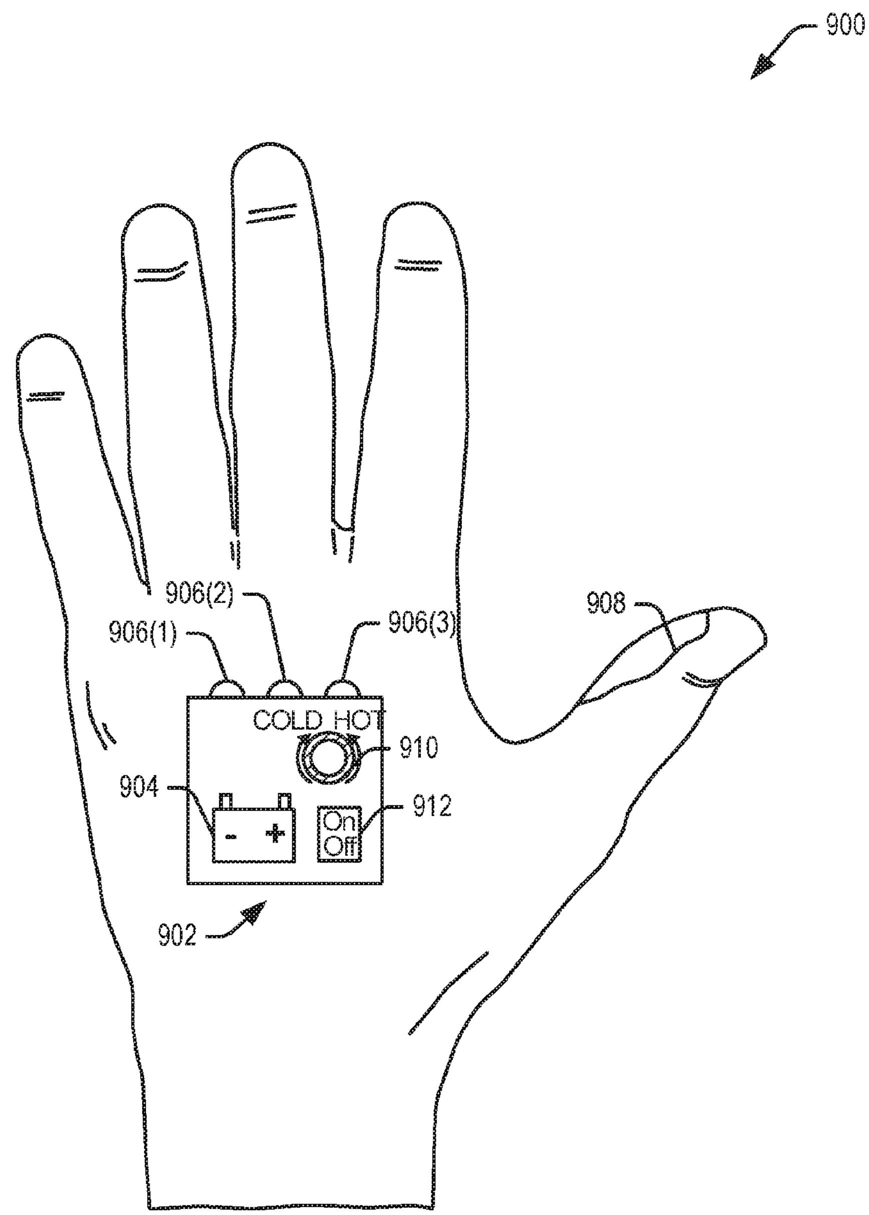
FIG. 9 illustrates an example glove used in connection with implementing techniques relating to determining inventory events using residual information, in accordance with at least one example.

FIG. 9 illustrates a wearable device in the form of an example glove 900 for implementing techniques relating to determining inventory events using residual information, in accordance with at least one example. The glove 900 can be worn by the operator 104 and/or other user as part of interacting with inventory items 40 at the inventory station 800 and at other locations throughout the inventory system 10. In some examples, the features of the glove 900 can be included in a wristband or other device mounted on an arm of the operator 104. In some examples, the glove 900 may include a management device 902 that receives power from a power source 904 and is configured to manage the operation of one or more devices 906(1)-906(3) and one or more heating elements 908 disposed at least in the palm of the glove 900 (e.g., opposite of side shown). The management device 902 may be in communication with a temperature controlling device 910 and a power switch 912.

In some examples, the management device 902 may include one or more integrated circuits, a display, and other input/output devices for user interaction with the glove 900. The one or more devices 906(1)-906(3) may include an image capture device 906(1), a temperature sensing device 906(2), and a light emitting device 906(3). The image capture device 906(1) is an example of the image capture device 106 and may be configured accordingly. The temperature sensing device 906(2) may be any suitable device capable of detecting temperature. In some examples, the temperature sensing device 906(2) may include a laser configured to detect a temperature of an object separate from the glove 900. In some examples, the temperature sensing device 906(2) may be configured to detect ambient temperature of the environment surrounding the glove 900. The light emitting device 906(3) may be any suitable device including a lighting element. For example, the light emitting device 906(3) may include one or more light emitting diodes (LED) perhaps arranged in a cluster and configured to emit light to excite certain light-activated material that may be present on the inventory items 40, the inventory holder 30, other storage structures, and the like. In some examples, different LEDs of the light emitting device 906(3) may emit light at different frequencies, which may be visible to a human user or invisible, to excite different materials used in the light-activated material.

The heating elements 908 may be disposed primarily throughout the palm and/or fingers of the glove 900 (e.g., opposite of side shown). The heating elements 908 may include a series of thin electrically conductive elements disposed throughout the glove 900 and in electrical communication with each other. The management device 902 may be used to provide an electrical current to the heating elements 908 to heat the glove 900. In some examples, heating the glove 900, especially the palm that will be brought into contact with the inventory items 40 as they are grabbed by the operator 104 wearing the glove 900, may provide for increased thermal contrast between the inventory holder 30 and the inventory items 40. This thermal contrast can be captured in one or more images captured by the image capture device 906(1). The gloves 900 may be constructed to also provide cushioning for the hands of the operator 104.

The temperature controlling device 910 may be used to adjust the current (and therefore the temperature) being provided to the heating elements 908.

In some examples, one or more of the components of the glove 900 may be included in an automated operator (e.g., a robotic arm) that interacts with inventory items 40. For example, the heating elements 908 may be included in an end effector of the automated operator. In this manner, as the end effector is used to interact with the inventory item 40, the heating elements 908 may warm the inventory item 40. As an additional example, the light emitting device 906(3) may be included in an end region of the automated operator (e.g., adjacent the end effector). In this manner, as the end effector is used to interact with the inventory item 40 and the inventory structure, the light emitting device 906(3) may excite light-activated elements attached to the inventory item 40 or associated with the inventory structure.

Figure 10:
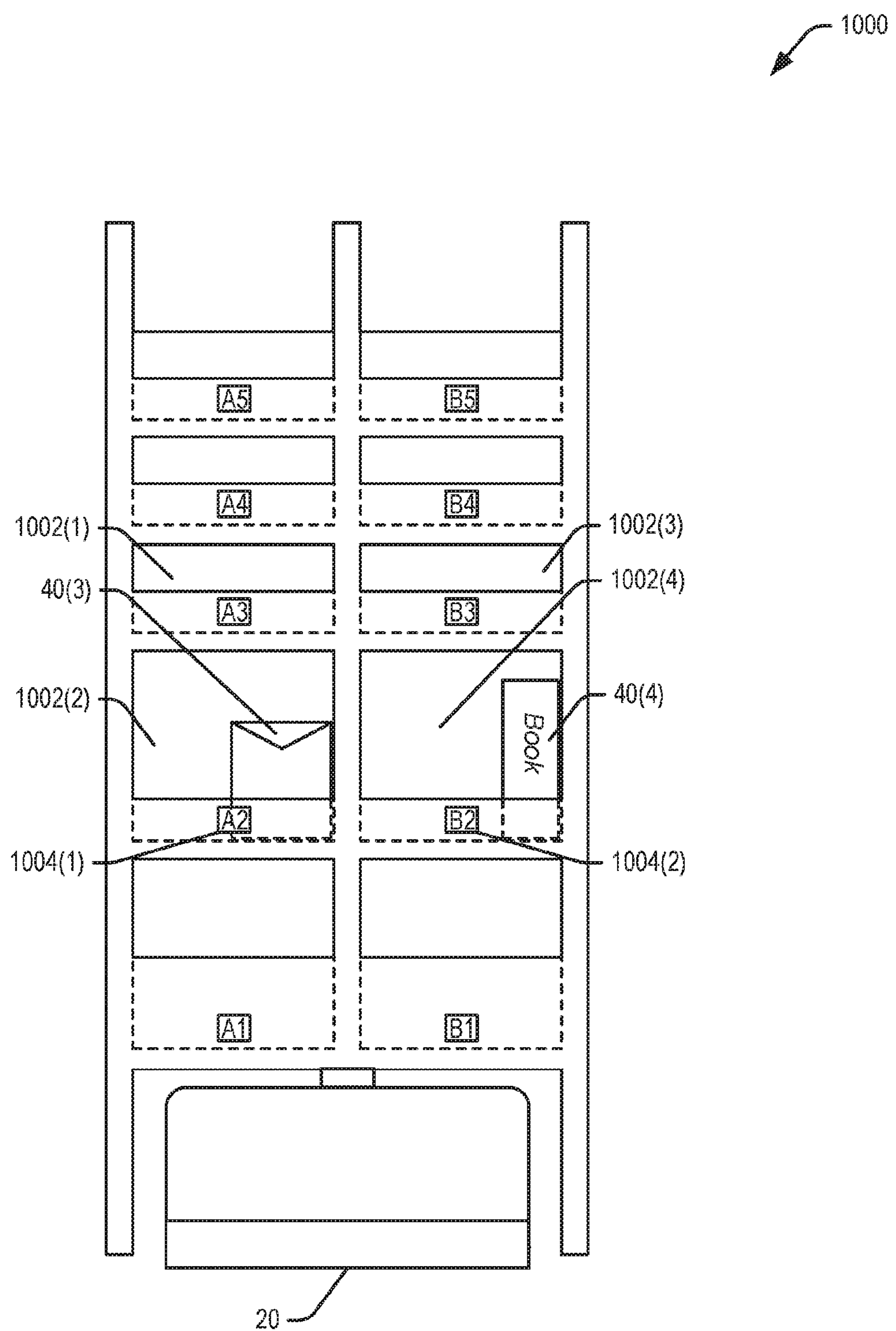
FIG. 10 illustrates an example inventory holder for use in connection with implementing techniques relating to determining inventory events using residual information, in accordance with at least one example.

FIG. 10 illustrates an example inventory holder 1000 for use in connection with implementing techniques relating to determining inventory events using residual information, in accordance with at least one example. The inventory holder 1000 is an example of the inventory holder 30 described herein and is therefore shown detachably coupled to the mobile drive unit 20. The inventory holder 1000 may include a plurality of compartments 1002 for retaining a plurality of inventory items 40. In some examples, each of the compartments 1002 may include an identifier label 1004. The identifier label 1004 may include human-readable information, machine-readable information, and/or a combination of human- and machine-readable information. For example, the identifier label 1004(1) can include a label A2 indicating that the compartment 1002(2) is in located in column A and row 2. In some examples, the identifier labels 1004 may include a barcode or other optical machine-readable representation of data. The identifier label 1004 can be recorded as the operator 104 places inventory items 40 in the compartments 1002. In some examples, the identifier labels 1004 may each be unique as to the inventory holder 1000 and/or may each be entirely unique as to other identifier labels on other inventory holders 1000.

In the example illustrated, the inventory holder 1000 includes the inventory items 40(3) and 40(4), 40(4) located in the compartments 1002(2) and 1002(4), respectively. The inventory items 40(3) may be at least partially hidden because the compartments 1002 have small walls, ridges or lips for keeping items in the compartments 1002.

Figure 11:
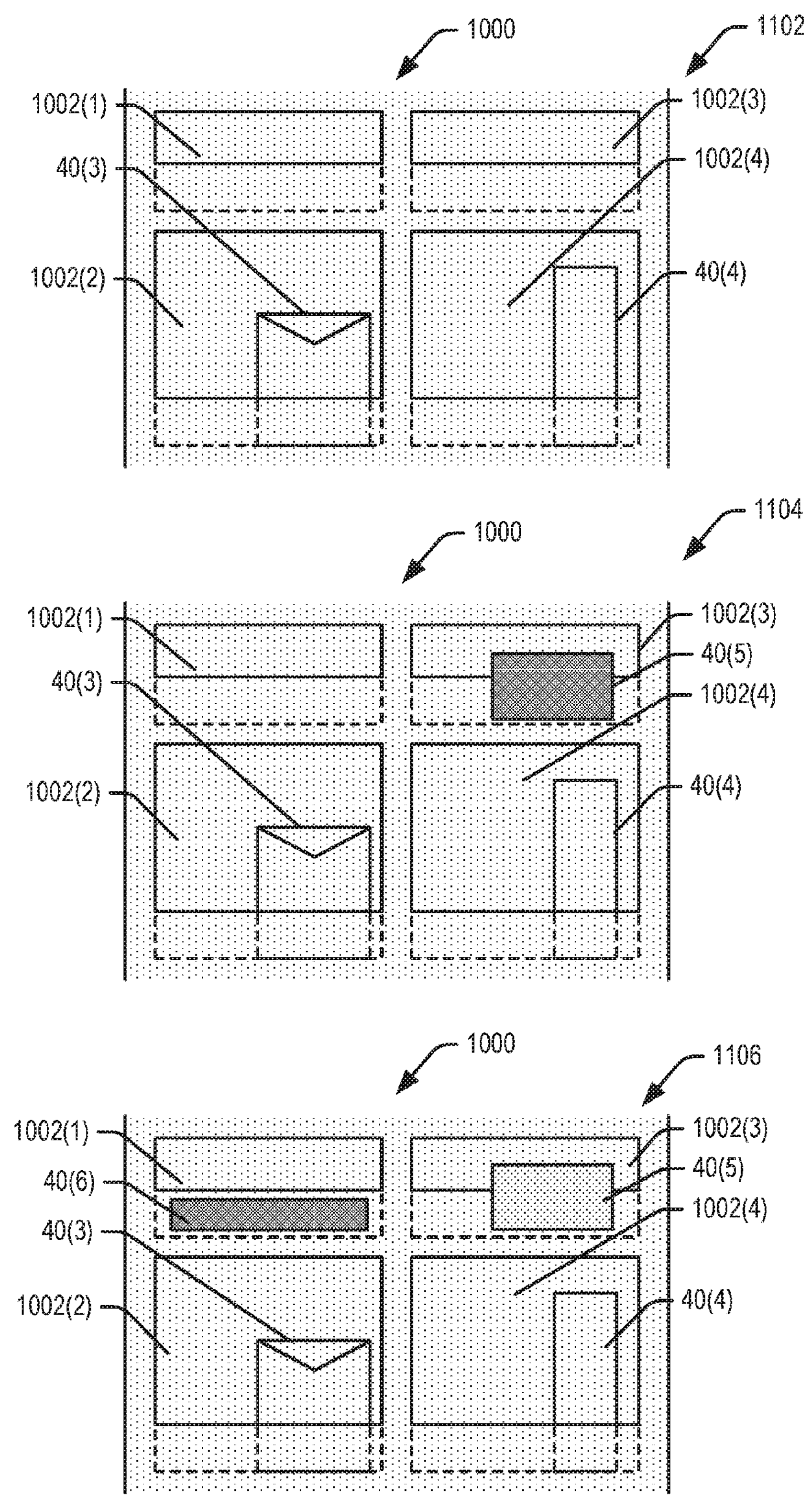
FIG. 11 illustrates thermal images depicting a portion of an inventory holder as it relates to implementing techniques relating to determining inventory events using residual information, in accordance with at least one example.

FIG. 11 illustrates thermal images 1102-1106 depicting a portion of the inventory holder 1000 as it relates to implementing techniques relating to determining inventory events using residual information, in accordance with at least one example. The thermal images 1102-1106 may have been captured by the image capture device 106. In some examples, the thermal image 1102 may depict a view of the inventory holder 1000 as illustrated in FIG. 10. In particular, the inventory items 40(3), 40(4) are shown placed in the compartments 1002(2), 1002(4). The thermal image 1102 may have been captured prior to the operator 104 interacting with other inventory items 40. The inventory holder 1000 and the inventory items 40(3), 40(4) may have a first cool temperature. This may be illustrated by the fill shading used to illustrate the thermal image 1102.

The thermal image 1104 may depict a view of the inventory holder 1000 at a time after the thermal image 1102 was captured. For example, in between when the thermal image 1102 and the thermal image 1104 were captured, the inventory item 40(5) was placed in the compartment 1002(3). The compartment 1002(3) was previously empty (e.g., in the thermal image 1102). In some examples, the operator 104, whether human or automated, may have placed the inventory item 40(5) in the compartment 1002(3). In some examples, interaction with a hand of the operator 104, whether using a glove or not, may warm the surface of the inventory item 40(5). Thus, the thermal image 1104 may depict the inventory item 40(5) differently than the inventory holder 1000 and the inventory items 40(3), 40(4). This may be because a first temperature of the inventory item 40(5) may be greater than a second range of temperatures associated with the inventory holder 1000 and the inventory items 40(3), 40(4). In some examples, this difference in temperature may be considered a residual heat region because it is present as a result of interaction with the inventory item 40(5) and corresponds approximately in size and shape to the inventory item 40(5).

The thermal image 1106 may depict a view of the inventory holder 1000 at a time after the thermal image 1104 was captured. For example, in between when the thermal image 1106 and the thermal image 1104 were captured, the inventory item 40(6) was placed in the compartment 1002(1). The compartment 1002(1) was previously empty (e.g., in the thermal image 1104). Like the inventory item 40(5), the operator 104 may have placed the inventory item 40(6) in the compartment 1002(1). The thermal image 1106 may depict the inventory items 40(5), 40(6) differently than the inventory holder 1000 and the inventory items 40(3), 40(4). This may be because a first temperature of the inventory item 40(6) may be greater than a second temperature of the inventory item 40(5) and a range of temperatures associated with the inventory holder 1000 and the inventory items 40(3), 40(4). In some examples, these differences in temperature may be considered residual heat regions because they are present as a result of interaction with the inventory items 40(5), 40(6) and correspond approximately in size and shape to the inventory items 40(5), 40(6). In some examples, the inventory item 40(5) is cooler in temperature than the inventory item 40(6) because the inventory item 40(5) has been placed in the inventory holder 1000 for a longer period of time (e.g., allowed time to cool). This may enable detection of an order by which the operator 104 interacted with the inventory items 40 at the inventory holder 1000 (e.g., placed the inventory item 40(5) in the compartment 1002(3), then placed the inventory item 40(6) in the compartment 1002(1)). This information can be used to evaluate the efficiency of the operator's 104 interactions. This information may also be compared to inventory information developed by other systems to determine and/or confirm that the inventory items 40 have been placed in the inventory holder 1000.

Figure 12:
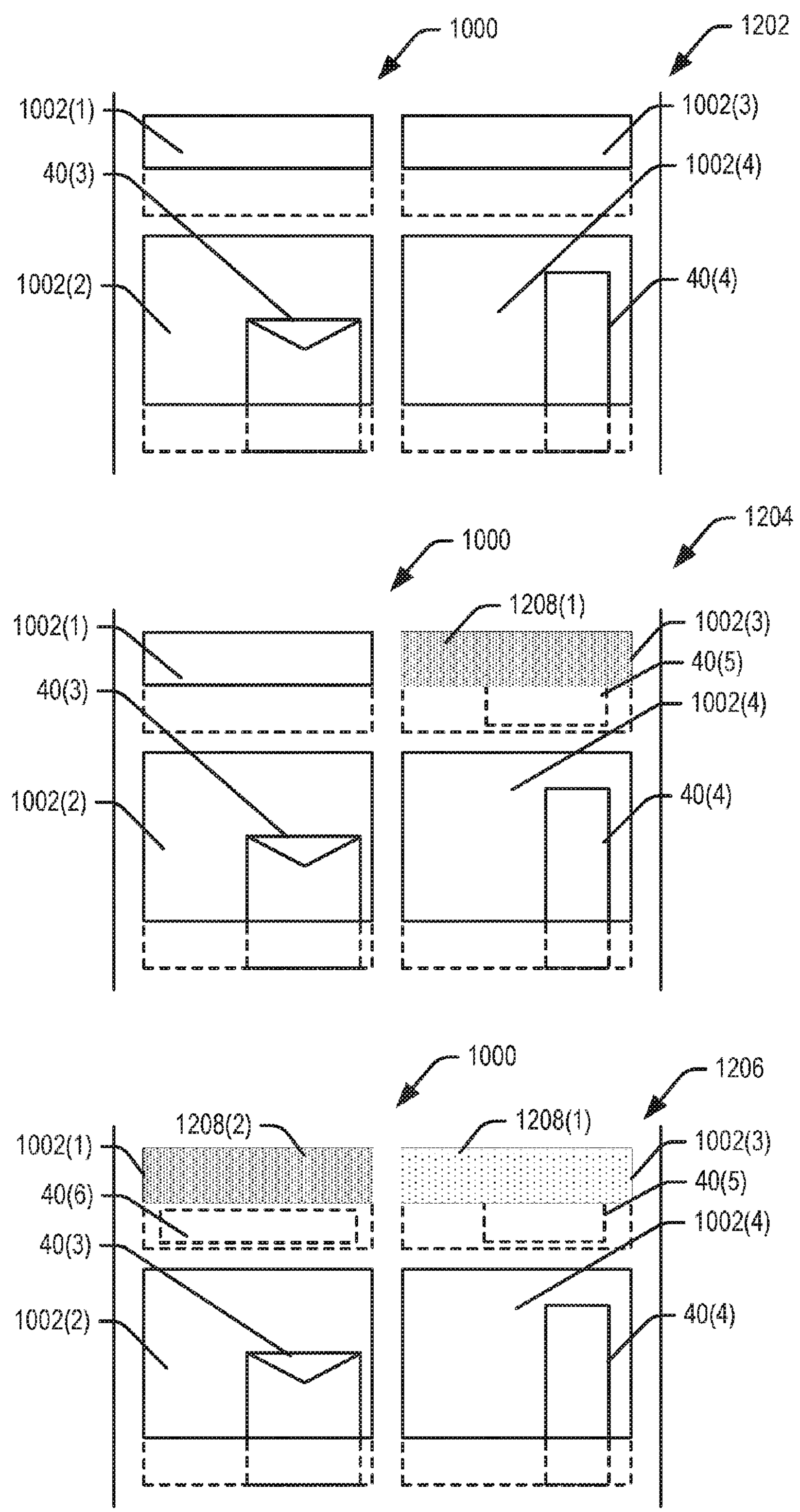
FIG. 12 illustrates images depicting a portion of an inventory holder as it relates to implementing techniques relating to determining inventory events using residual information, in accordance with at least one example.

FIG. 12 illustrates images 1202-1206 depicting a portion of the inventory holder 1000 as it relates to implementing techniques relating to determining inventory events using residual information, in accordance with at least one example. The images 1202-1206 may have been captured by the image capture device 106. In some examples, the image 1202 may depict a view of the inventory holder 1000 as illustrated in FIG. 10. In particular, the inventory items 40(3), 40(4) are shown placed in the compartments 1002(2), 1002(4). The image 1202 may have been captured prior to the operator 104 interacting with other inventory items 40.

The image 1204 may depict a view of the inventory holder 1000 at a time after the image 1202 was captured. For example, in between when the image 1202 and the image 1204 were captured, the inventory item 40(5) was placed in the compartment 1002(3). The compartment 1002(3) was previously empty (e.g., in the image 1202). In some examples, the operator 104, whether human or automated, may have placed the inventory item 40(5) in the compartment 1002(3). In some examples, a light may be emitted into the compartment 1002(3) as part of placing the inventory item 40(5). This light, which may be emitted by the glove 900 or other device, may excite a light-activated element disposed within the compartment 1002(3) or attached to the inventory item 40(5). For example, the light-activated element may be a coating applied to the interior and/or exterior surfaces of the compartment 1002(3). The light-activated element may also be a strip of material that has been attached to the compartment 1002(3) using an adhesive or otherwise. In the excited state, the light activated material may emit light within the compartment 1002(3). This is illustrated by residual light region 1208(1). In some examples, the difference in light emission between the residual light region 1208(1) and the inventory items 40(3), 40(4) and the inventory holder 1000 may be present in the image 1204.

As described herein, the light activated element may be any suitable material capable of being activated by light. In some examples, the light-activated element may be formed from a phosphorescent or fluorescent material. In this manner, the light activated element may "glow in the dark" or otherwise have phosphorescent and/or fluorescent properties. In some examples, the light-activated element may emit electromagnetic radiation at any suitable frequency along the electromagnetic spectrum, and the image capture device 106 may be configured to detect the emission of the electromagnetic radiation in the images 1204 and 1206. In some examples, the light-activated element may emit electromagnetic radiation at frequencies between near ultraviolent to far infrared, which can include frequencies that are visible to humans.

The image 1206 may depict a view of the inventory holder 1000 at a time after the image 1204 was captured. For example, in between when the image 1206 and the image

1204 were captured, the inventory item 40(6) was placed in the compartment 1002(1). The compartment 1002(1) was previously empty (e.g., in the image 1204). Like the inventory item 40(5), the operator 104 may have placed the inventory item 40(6) in the compartment 1002(1). The image 1206 may depict residual light regions 1208(1), 1208(2). The residual light regions 1208(1), 1208(2) may be present in the image 1206 because light-activated elements in the compartments 1002(1), 1002(3) and/or on the inventory items 40(5), 40(6) have been activated as part of stowing the inventory items 40(5), 40(6). In some examples, the difference in light emission between the residual light regions 1208(1), 1208(2) and the inventory items 40(3), 40(4) and the inventory holder 1000 may be present in the image 1206. For example, because the inventory item 40(5) was placed prior to the inventory item 40(6), in the image 1206, the residual light region 1208(2) may be more intense (e.g., brighter) than the residual light region 1208(1). Like the differences in temperature corresponding to the residual heat regions, the differences in intensity between the residual light regions 1208 may be detected and used to determine information about how the operator 104 interacted with the inventory items 40 and the inventory holder 1000. This can include determining an order of interactions, a mapping of interactions to compartments 1002, and the like.

Figure 13:
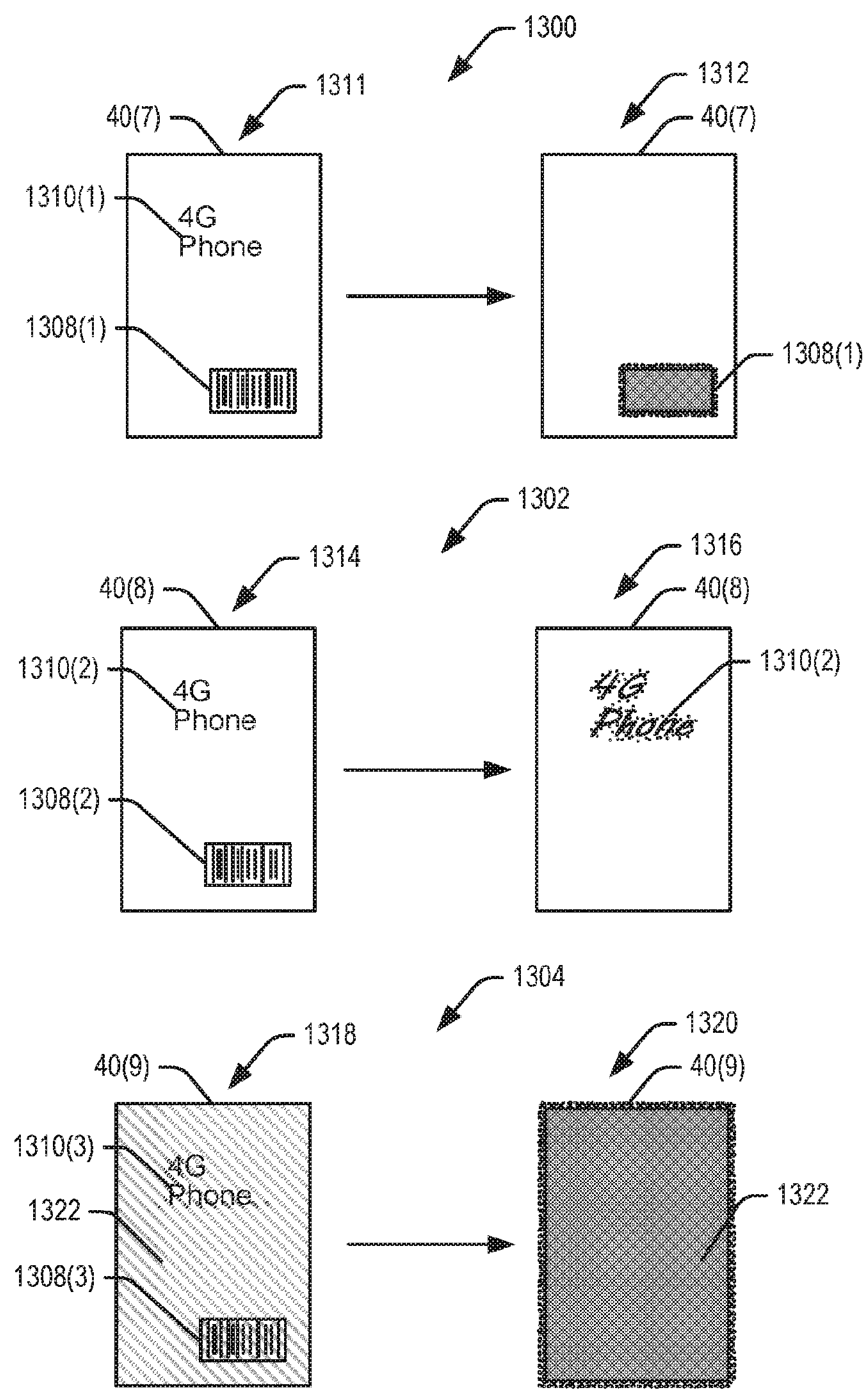
FIG. 13 illustrates light-activated sequences as it relates to implementing techniques relating to determining inventory events using residual information, in accordance with at least one example.

FIG. 13 illustrates light-activated sequences 1300-1304 as it relates to implementing techniques relating to determining inventory events using residual information, in accordance with at least one example. The light-activated sequences 1300-1304 may illustrate examples of how aspects of the inventory items 40(7)-40(9) including light-activated elements may be excited when certain light is emitted in their direction. In some examples, the function described with reference to the light activated sequences 1300-1304 may be implemented in the inventory holder 1000 as discussed with reference to FIG. 12, in other words, instead of or in addition to the light-activated material being disposed in the compartments 1002. As discussed with reference to FIG. 13, light-activated material may be attached to or otherwise associated with the inventory items 40 themselves.

Beginning with the light-activated sequence 1300, in the light-activated sequence 1300 the inventory item 40(7) may include a machine identifier 1308(1) and a human identifier 1310(1). The light-activated sequence 1300 may depict the inventory item 40(7) in a pre-excited state 1311 on the left and in an excited state 1312 on the right. In some examples, the inventory item 40(7) may have been captured in one or more images in the pre-excited state 1311 and/or the excited state 1312. In the light-activated sequence 1300, the machine identifier 1308(1) may have been treated with a light-activated material. For example, the light-activated material may have been applied to the machine identifier 1308(1) by spraying, printing, wiping, marking, or in any other suitable manner. Thus, in the excited state 1312 (e.g., after a light has been directed towards the machine identifier 1308(1)), the machine identifier 1308(1) is illustrated as emitting light. When the inventory item 40(7) is located in the inventory holder 1000, the emission of light from the machine identifier 1308(1), as captured in an image, may be used to determine that the inventory item 40(7) has been placed in the inventory holder 1000.

In the light-activated sequence 1302, the inventory item 40(8) may include a machine identifier 1308(2) and a human identifier 1310(2). The light-activated sequence 1302 may depict the inventory item 40(8) in a pre-excited state 1314 on the left and in an excited state 1316 on the right. In some examples, the inventory item 40(8) may have been captured in one or more images in the pre-excited state 1314 and/or the excited state 1316. In the light-activated sequence 1302, the human identifier 1310(2) may have been treated with a light-activated material. For example, the light-activated material may have been applied to the human identifier 1310(2) by spraying, printing, wiping, marking, or in any other suitable manner. Thus, in the excited state 1316 (e.g., after a light has been directed towards the human identifier 1310(2)), the human identifier 1310(2) is illustrated as emitting light. When the inventory item 40(8) is located in the inventory holder 1000, the emission of light from the human identifier 1310(2), as captured in an image, may be used to determine that the inventory item 40(8) has been placed in the inventory holder 1000.

In the light-activated sequence 1304, the inventory item 40(9) may include a machine identifier 1308(3), a human identifier 1310(3), and a packing film 1322. The light-activated sequence 1304 may depict the inventory item 40(9) in a pre-excited state 1318 on the left and in an excited state 1320 on the right. In some examples, the inventory item 40(9) may have been captured in one or more images in the pre-excited state 1318 and/or the excited state 1320. In the light-activated sequence 1304, the packing film 1322 may have been treated with a light-activated material. For example, the light-activated material may have been applied to the packing film 1322 by spraying, printing, wiping, marking, during manufacturing, or in any other suitable manner. Thus, in the excited state 1320 (e.g., after a light has been directed towards the packing film 1322)), the packing film 1322 is illustrated as emitting light. When the inventory item 40(9) is located in the inventory holder 1000, the emission of light from the packing film 1322, as captured in an image, may be used to determine that the inventory item 40(9) has been placed in the inventory holder 1000.

FIGS. 14, 15, 16, and 17 illustrate example flow diagrams showing respective processes 1400, 1500, 1600, and 1700 as described herein. These processes 1400, 1500, 1600, and 1700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 14:
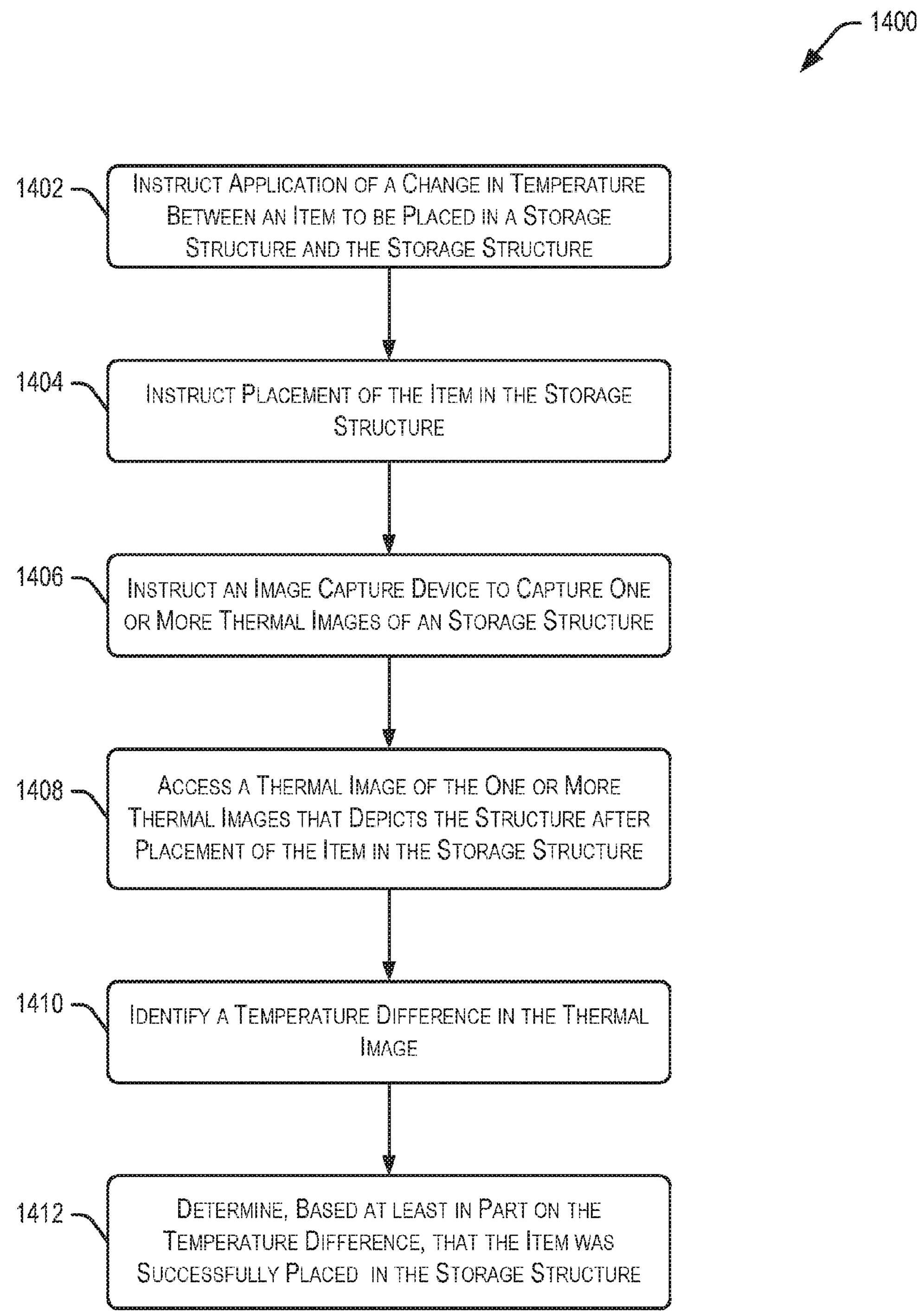
FIG. 14 depicts a flow chart including example acts or techniques relating to determining inventory events using residual heat information, in accordance with at least one example.

FIG. 14 depicts the process 1400 including example acts or techniques relating to determining inventory events using residual heat information, in accordance with at least one example. The event detection engine 710, whether embodied in the inventory management system 112 or the user device 702, may perform the process 1400 of FIG. 14.

The process 1400 may begin at 1402 by instructing application of a change in temperature between an item to be placed in a storage structure and the storage structure. Instructing application may include an operator contacting the item to cause a temperature of the item to rise. In some examples, instructing application may include application of heat to the item by a first temperature changing device and/or removal of heat from the storage structure by a second temperature changing device.

At 1404, the process 1400 may include instructing placement of the item in the storage structure. The instruction may be provided to an automated operator, to a display viewable by a human operator, or in any other suitable manner.

At 1406, the process 1400 may include instructing an image capture device to capture one or more thermal images of the storage structure. The storage structure can include a inventory holder, a temporary storage location, an inventory exchange wall, a table, a set of inventory containers, a set of shelves, any other suitable structure where items may be placed or from where items may be removed. The inventory exchange wall is a location in the inventory system where items can be processed (e.g., as part of building customer orders that include more than one item). The inventory exchange wall may include a plurality of openings extending through the inventory exchange wall. Operators can access each side of the inventory exchange wall and place and remove items from the openings.

The instructing to capture may be in response to an input signal. The input signal can include any suitable signal which can be processed to determine an appropriate time to capture the one or more thermal images. For example, the signal can include at least one of object detection information indicating that an area opposite the inventory holder is unobstructed, scan information indicating that the operator has scanned the item or a compartment, timer information indicating that a predetermined time has passed since the operator has taken a certain action, button information indicating that the operator has pushed a button indicating that the item has been stowed, position information indicating that no obstructions are detected by a position detection device, or any other suitable information.

At 1408, the process 1400 includes accessing a thermal image of the one or more thermal images that depicts the storage structure after the item has been placed in the storage structure. In some examples, the thermal image may include a residual heat region corresponding to the item.

At 1410, the process 1400 includes identifying a temperature difference in the thermal image. The temperature difference may correspond to the residual heat region present in the thermal image. The temperature difference may be present because the temperature of the item is greater than the ambient temperature and/or the temperature of the storage structure. The item may have a temperature that is greater than an ambient temperature. This may be because of physical contact between the operator and the item. In some examples, the item is preheated using a temperature changing device. In some examples, the ambient temperature and/or the temperature of the storage structure is reduced using a temperature changing device.

At 1412, the process 1400 includes determining, based at least in part on the temperature difference, that the item was successfully placed in the storage structure. In some examples, this can include confirming that the item was stowed based at least in part on inventory information generated in response to the operator taking one or more actions with respect to the item as part of stowing the item. In some examples, determining that the item was successfully placed in the storage structure may include comparing two or more thermal images. Comparing the thermal images can include identifying a residual heat region present in a second thermal image and determining, based at least in part on inventory information, that the residual heat region corresponds to the item. The inventory information can include position information detected by a position detection device, scan information collected from a handheld scanning device of the operator, and any other suitable information identifying aspects of the inventory managed by the inventory management system.

Figure 15:
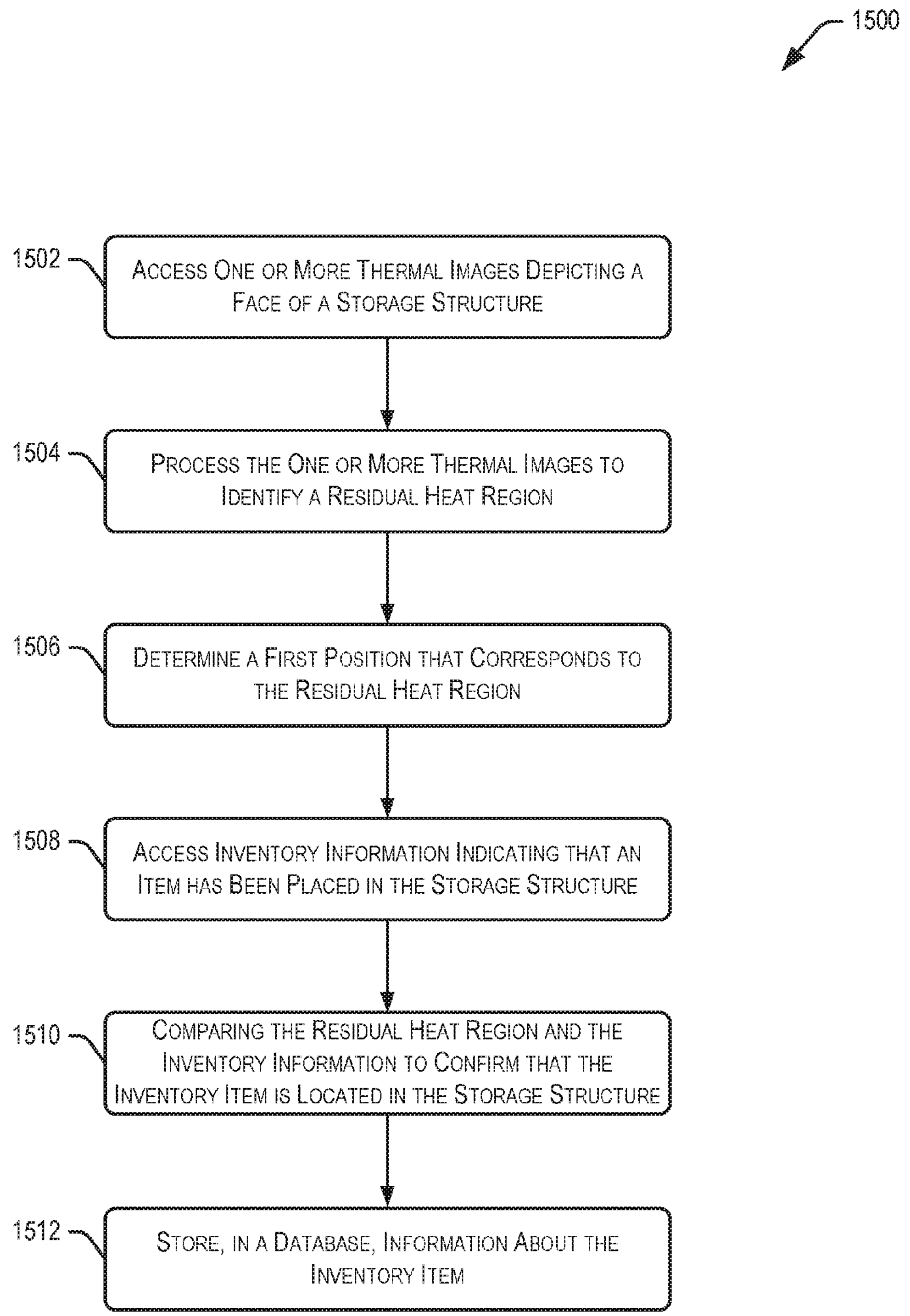
FIG. 15 depicts a flow chart including example acts or techniques relating to determining inventory events using residual heat information, in accordance with at least one example.

FIG. 15 depicts the process 1500 including example acts or techniques relating to determining inventory events using residual heat information, in accordance with at least one example. The event detection engine 710, whether embodied in the inventory management system 112 or the user device 702, may perform the process 1500 of FIG. 15.

The process 1500 may begin at 1502 by accessing one or more thermal images depicting a face of a storage structure. The storage structure can include a plurality of compartments and the one or more thermal images can be captured by a thermal imaging device.

At 1504, the process 1500 includes processing the one or more thermal images to identify a residual heat region. The residual heat region may be present in the one or more thermal images. In some examples, the residual heat region may be a region in the images where a temperature difference is present between an item and a portion of the storage structure surrounding the item. The residual heat region may be present as a result of stowing the item in a compartment of the storage structure.

At 1506, the process 1500 includes determining a first position that corresponds to the residual heat region. This first position may correspond to the compartment of the storage structure in which the item was placed. In some examples, the first position may be identified based at least in part on position information generated in response to an object breaking a light plane at a location that maps to the compartment of the storage structure. In this manner, the position information may indicate where (e.g., a bin number, a container number, an X and Y coordinate corresponding to a compartment of the storage structure, etc.) the item was likely placed. The techniques described herein may also determine and/or confirm that the item was indeed placed (e.g., left behind in the compartment) and/or removed (e.g., removed from the compartment).

At 1508, the process 1500 includes accessing inventory information indicating that an item has been placed in the storage structure. In some examples, the inventory information may be generated in response to an action by the operator that placed the item. For example, the operator may scan the item using a handheld scanner as part of stowing the item. The operator may also scan the compartment (e.g., a barcode associated with the compartment) using the handheld scanner as part of stowing the item. This inventory information can be used to further inform the process 1500 and may minimize instances of false positives (e.g., the inventory management system recording the item as placed, but it was actually not placed).

At 1510, the process 1500 includes comparing the residual heat region and the inventory information to confirm that the item is located in the storage structure. As introduced previously, the process 1500 can include confirming that the item is indeed located in the storage structure. This can include comparing the residual heat region (e.g., an element in an image that corresponds to the item) with the inventory information (e.g., some information that indicates that the item was placed) in order to generate a reconciliation task. The reconciliation task may be generated when it cannot be confirmed that the item is located at the first position. The reconciliation task can include an instruction for a mobile drive unit to move the storage structure to a reconciliation station where the items can be reconciled.

At 1512, the process 1500 stores, in a database, information about the inventory item. For example, the information may indicate that the inventory item is located in the storage structure. The database may be used to track the location and movements of the inventory item.

Figure 16:
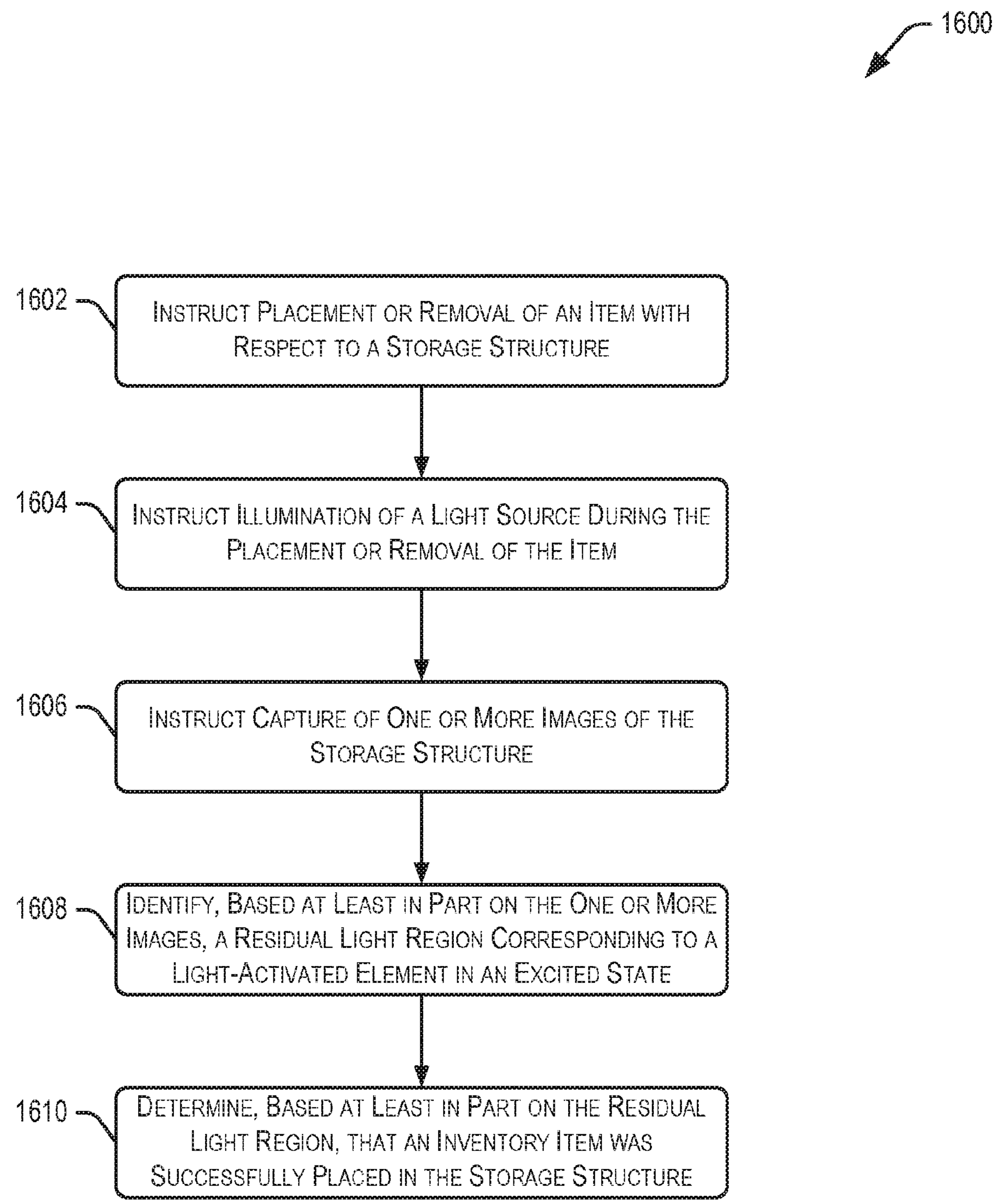
FIG. 16 depicts a flow chart including example acts or techniques relating to determining inventory events using residual light information, in accordance with at least one example.

FIG. 16 depicts the process 1600 including example acts or techniques relating to determining inventory events using residual light information, in accordance with at least one example. The event detection engine 710, whether embodied in the inventory management system 112 or the user device 702, may perform the process 1600 of FIG. 16.

The process 1600 may begin at 1602 by instructing placement or removal of an item with respect to a storage structure. In some examples, the instructing relates to placement or removal of the item with respect to a compartment of the storage structure.

At 1604, the process 1600 includes instructing illumination of a light source during the placement or removal. The light source may be configured to excite a light-activated element associated with at least one of the item or the compartment.

At 1606, the process 1600 includes instructing capture of one or more images of the storage structure. The one or more images may be captured by an imaging device in response to an input signal. In some examples, instructing capture may include accessing the one or more images, which may include receiving the images from the imaging device, retrieving the images from memory, receiving them from a local user device, or in any other suitable manner. The storage structure can include a plurality of compartments configured to receive one or more items.

At 1608, the process 1600 includes identifying, based at least in part on the one or more images, a residual light region corresponding to a light-activated element in an excited state. The light-activated element may be attached to an item in a compartment of the storage structure and/or located within the compartment of the storage structure. In some examples, an emission of a light source may cause the excited state of the light-activated element. In some examples, the light-activated element may include a phosphorescent coating applied to the compartment or a portion of the item (e.g., a packaging material in which the item is packaged or a tag attached to the item). In some examples, in the excited state, the light-activated element may have absorbed light energy from the light source. The light-activated element may be configured to gradually release the energy in the form of light energy. In some examples, the light source may be included in an item worn (e.g., a glove or wristband) by a human operator that placed the item in the compartment or removed the item from the compartment. In some examples, an automated operator (e.g., a robotic arm) may include a light element that emits light to excite light-activated elements. In this example, as the automated operator stows or removes items from the storage structure, the light element can excite the light-activated elements.

At 1610, the process 1600 includes determining, based at least in part on the residual light region, that an item was successfully placed in the storage structure. In some examples, this can include determining whether the item was successfully placed in the storage structure and/or whether the item was successfully removed from the storage structure. In some examples, determining that the item was successfully placed or removed may be based at least in part on position information. The position information may indicate one or more positions where a light plane was broken as part of a placement sequence or a removal sequence.

Figure 17:
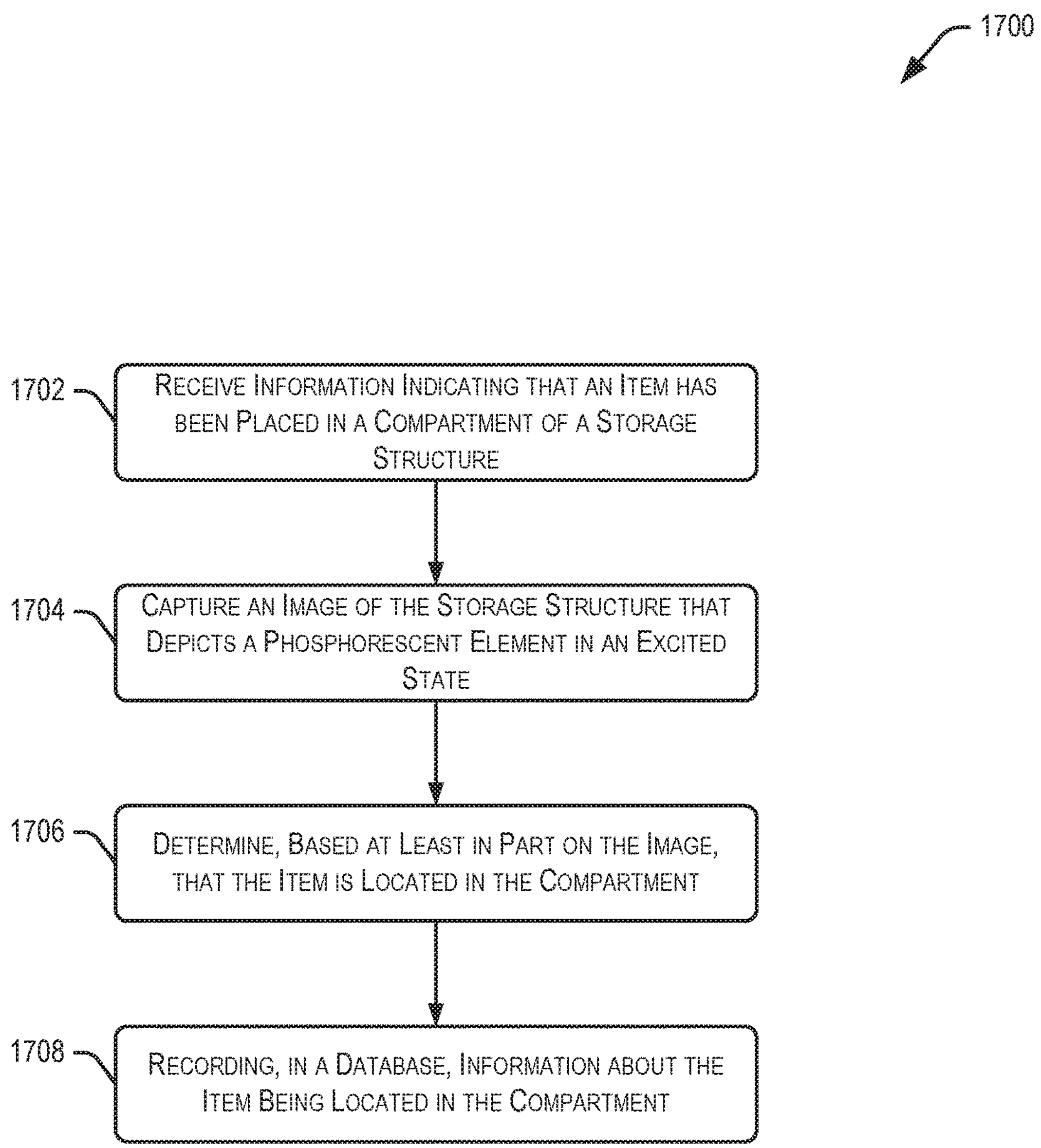
FIG. 17 depicts a flow chart including example acts or techniques relating to determining inventory events using residual light information, in accordance with at least one example.

FIG. 17 depicts the process 1700 including example acts or techniques relating to determining inventory events using residual light information, in accordance with at least one example. The event detection engine 710, whether embodied in the inventory management system 112 or the user device 702, may perform the process 1700 of FIG. 17.

The process 1700 may begin at 1702 by receiving information indicating that an item has been placed in a compartment of a plurality of compartments of a storage structure.

At 1704, the process 1700 includes capturing an image of the storage structure that depicts a phosphorescent element in an excited state. The phosphorescent element may be located within the compartment or attached, applied, or otherwise associated with the item. The excited state may be caused by emission of a light source included in an activation glove and directed towards the phosphorescent element. The activation glove can include an image capture device, a light source, and a power source configured to provide power to the image capture device and the light source.

In some examples, the process 1700 also includes capturing one or more other images of the storage structure. The one or more other images may depict one or more other phosphorescent elements in varying degrees of the excited state. Based at least in part on the image and the one or more other images, placement information may be generated that indicates an order that the phosphorescent element and the one or more other phosphorescent elements were interacted with by the activation glove. This placement information can be used to evaluate the efficiency of the operator's interactions with the storage structure and for any other suitable purpose.

At 1706, the process 1700 includes determining, based at least in part on the image, that the item is located in the compartment. This can include determining that a residual light region in the image corresponding to the phosphorescent element corresponds to the item.

At 1708, the process 1700 includes recording, in a database, information about the item being located in the compartment. In some examples, the database includes the inventory information database 720.

Figure 18:
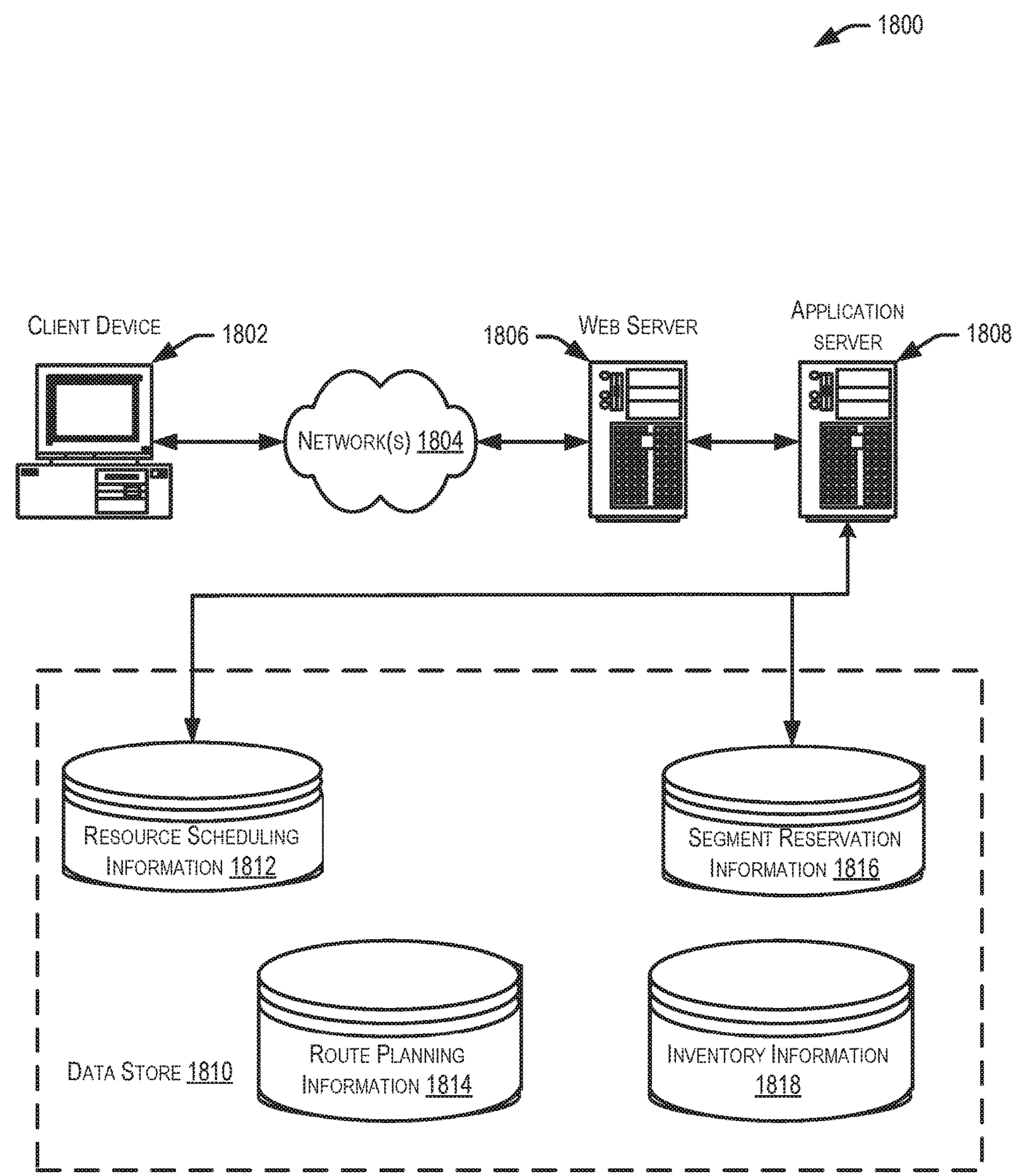
FIG. 18 illustrates an environment in which various embodiments can be implemented.

FIG. 18 illustrates aspects of an example environment 1800 for implementing aspects in accordance with various embodiments. As will be appreciated, although a Web-based environment is used for purposes of explanation, different environments may be used, as appropriate, to implement various embodiments. The environment includes an electronic client device 1802, which can include any appropriate device operable to send and receive requests, messages, or information over an appropriate network 1804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1806 for receiving requests and serving content in response thereto, although for other networks an alternative device serving a similar purpose could be used as would be apparent to one of ordinary skill in the art.

The illustrative environment includes at least one application server 1808 and a data store 1810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1802 and the application server 1808, can be handled by the Web server. It should be understood that the Web and application servers are not required and are merely example components, as structured code discussed herein can be executed on any appropriate device or host machine as discussed elsewhere herein.

The data store 1810 can include several separate data tables, databases or other data storage mechanisms and media for storing data relating to a particular aspect. For example, the data store illustrated includes mechanisms for storing information which can be used by modules described herein, such as resource scheduling information 1812, route planning information 1814, segment reservation information 1816, and/or inventory information 1818. The inventory information 1818 can include information about inventory processed in the inventory system 10. This can include unique item identifiers, item descriptors, storage locations, and the like. It should be understood that there can be many other aspects that may need to be stored in the data store, such as for page image information and to access right information, which can be stored in any of the above listed mechanisms as appropriate or in additional mechanisms in the data store 1810. The data store 1810 is operable, through logic associated therewith, to receive instructions from the application server 1808 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the description herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature and not limiting to the scope of the description.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the description and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the description as set forth in the claims.

Other variations are within the spirit of the present description. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this description are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:

an inventory holder comprising a plurality of faces, a first face of the plurality of faces comprising a plurality of compartments configured to receive inventory items;

a temperature changing device configured to at least heat the inventory items;

a thermal imaging device configured to capture thermal images of at least the first face of the plurality of faces when the first face is oriented towards the thermal imaging device; and a computing device configured to:

instruct warming, via the temperature changing device, of an inventory item to be stowed in a compartment of the inventory holder;

instruct stowing of the inventory item in the compartment;

instruct, in response to an input signal, the thermal imaging device to capture one or more thermal images of the first face;

identify, based at least in part on the one or more thermal images, a temperature difference between the inventory item stowed in the compartment of the inventory holder and a portion of the inventory holder surrounding the inventory item; and determine, based at least in part on the temperature difference, that the inventory item was successfully stowed in the compartment of the inventory holder.

2. The system of claim 1, wherein the input signal comprises at least one of object detection information indicating that an area opposite the first face is unobstructed, scan information indicating that an operator has scanned the inventory item as stowed, button information indicating that the operator has pushed a button indicating that the inventory item has been placed, position information indicating that no obstructions are detected by a position detection device, or timer information indicating that a predetermined time has passed since the operator has taken a certain action with respect to the inventory item.

3. The system of claim 1, further comprising an inventory container in which is held the inventory item prior to the inventory item being stowed in the compartment of the inventory holder, the temperature changing device configured to heat the inventory item while the inventory item is in the inventory container.

4. The system of claim 1, wherein the temperature changing device is a first temperature changing device, the system further comprising a second temperature changing device, wherein the computing device is configured to instruct cooling of the first face of the inventory holder prior to instructing stowing of the inventory item in the compartment.

5. The system of claim 1, wherein the computing device is further configured to receive position information indicating a position on a light plane that was broken as part of the inventory item being stowed in the compartment, and wherein determining that the inventory item was successfully stowed in the compartment of the inventory holder is based at least in part on the position information.

6. A computer-implemented method, comprising:

instructing, by a computing device, application of a change in temperature to at least one of an item to be placed in a storage structure or the storage structure;

instructing, by the computing device, placement of the item in the storage structure;

instructing capture, by a thermal imaging device, of one or more thermal images depicting the storage structure and the item after the item has been placed in the storage structure, the item having a first temperature that is different than a second temperature of the storage structure; and determining, by the computing device, that the item was successfully placed in the storage structure based at least in part on the one or more thermal images.

7. The computer-implemented method of claim 6, wherein the storage structure comprises at least one of (i) an inventory holder that comprises a plurality of compartments, the item being placed in a first compartment of the plurality of compartments, or (ii) an inventory exchange wall comprising a plurality of openings extending through the inventory exchange wall, and the one or more thermal images depict at least a first side of the inventory exchange wall.

8. The computer-implemented method of claim 6, wherein instructing application of a change in temperature comprises an operator contacting the item to cause the first temperature to be different from the second temperature.

9. The computer-implemented method of claim 8, wherein the operator contacts the item using a wearable device that causes at least a portion of the change in temperature.

10. The computer-implemented method of claim 6, wherein instructing application of a change in temperature comprises at least one of:

application of heat to the item by a first temperature changing device; or removal of heat from the storage structure by a second temperature changing device.

11. The computer-implemented method of claim 10, wherein at least one of the first temperature changing device or the second temperature changing device is included in a robotic arm that is instructed to place the item in the storage structure.

12. The computer-implemented method of claim 6, wherein determining that the item was successfully placed in the storage structure comprises:

identifying a residual heat region present in the one or more thermal images; and determining, based at least in part on inventory information, that the residual heat region corresponds to the item, the inventory information generated at least in part in response to an action by an operator that placed the item.

13. The computer-implemented method of claim 12, wherein the residual heat region comprises a temperature difference between the item and a portion of the storage structure surrounding the item.

14. The computer-implemented method of claim 6, further comprising:

receiving position information indicating a position on a light plane that was broken as part of the item being placed in the storage structure; and determining, based at least in part on the position information, a placed position of the item with respect to the storage structure; and storing, in a database, information about the placed position.

15. The computer-implemented method of claim 6, wherein the one or more thermal images comprise a residual heat region corresponding to the item, the method further comprising:

accessing one or more other thermal images depicting the storage structure, the one or more other thermal images:

being captured by the thermal imaging device after one or more other items have been placed in the storage structure; and comprising one or more other residual heat regions corresponding to the one or more other items; and generating, based at least in part on the residual heat region and the one or more other residual heat regions, placement information that at least indicates an order that the item and the one or more other items were placed.

16. A computer-implemented method, comprising:

accessing one or more thermal images depicting a face of an inventory holder, the inventory holder comprising a plurality of compartments, the one or more thermal images captured by a thermal imaging device;

processing the one or more thermal images to identify a residual heat region present in the one or more thermal images, the residual heat region caused by application of a change in temperature during placement of an inventory item in the inventory holder;

determining a first position with respect to the plurality of compartments that corresponds to the residual heat region;

comparing the residual heat region and inventory information to confirm that the inventory item is located at the first position; and storing, in a database, information about the inventory item being located at the first position.

17. The computer-implemented method of claim 16, further comprising accessing the inventory information indicating that the inventory item has been placed in the inventory holder, the inventory information being generated at least in part in response to an action by an operator that placed the inventory item.

18. The computer-implemented method of claim 16, further comprising generating a reconciliation task when it cannot be confirmed that the inventory item is located at the first position.

19. The computer-implemented method of claim 16, wherein the residual heat region comprises a temperature difference between the inventory item and a portion of the inventory holder surrounding the inventory item.

20. The computer-implemented method of claim 19, wherein an operator uses a wearable device to place the inventory item at the first position, the wearable device causing at least a portion of the temperature difference.

* * * * *